(12) United States Patent
Beye et al.

(10) Patent No.: US 9,572,403 B2
(45) Date of Patent: *Feb. 21, 2017

(54) SPACER TEXTILE MATERIAL WITH TENSILE STRANDS HAVING MULTIPLE ENTRY AND EXIT POINTS

(71) Applicant: NIKE, Inc., Beaverton, OR (US)

(72) Inventors: Douglas A. Beye, Beaverton, OR (US); Lysandre Follet, Portland, OR (US)

(73) Assignee: Nike, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/832,168

(22) Filed: Aug. 21, 2015

(65) Prior Publication Data

US 2015/0351497 A1    Dec. 10, 2015

Related U.S. Application Data

(63) Continuation of application No. 13/741,428, filed on Jan. 15, 2013, now Pat. No. 9,132,601.

(51) Int. Cl.
*A43B 23/00* (2006.01)
*A43B 23/02* (2006.01)
(Continued)

(52) U.S. Cl.
CPC ....... *A43B 23/0235* (2013.01); *A43B 23/0205* (2013.01); *A43B 23/0245* (2013.01); *A43B 23/0255* (2013.01); *A43C 11/002* (2013.01); *B32B 3/08* (2013.01); *B32B 5/02* (2013.01); *D04B 1/22* (2013.01); *D04B 21/20* (2013.01); *B32B 2250/20* (2013.01);
(Continued)

(58) Field of Classification Search
CPC ............ A43B 23/0205; A43B 23/0225; A43B 23/0235; A43B 23/024; A43B 23/0245; A43B 23/026; A43C 5/00
USPC .................................................... 36/45, 50.1
See application file for complete search history.

(56) References Cited

U.S. PATENT DOCUMENTS

| 4,333,978 A | 6/1982 | Kocher |
|---|---|---|
| 4,705,586 A | 11/1987 | Pouget et al. |

(Continued)

FOREIGN PATENT DOCUMENTS

| EP | 0212984 A2 | 3/1987 |
|---|---|---|
| EP | 0874076 A2 | 10/1998 |

(Continued)

OTHER PUBLICATIONS

International Preliminary Report on Patentability and Written Opinion for Application No. PCT/US2014/011386, mailed on Jul. 21, 2015.

(Continued)

*Primary Examiner* — Marie Bays
(74) *Attorney, Agent, or Firm* — Klarquist Sparkman, LLP

(57) ABSTRACT

A spacer textile material has at least a portion of a tensile strand located between a first layer and a second layer of the spacer textile material where the first layer and second layer have been joined together to form channels in which the tensile strand moves freely. The tensile strand may be disposed within or about the spacer textile material in any location on the material. The spacer textile material with a tensile strand may be incorporated into an article of footwear and/or article of apparel.

28 Claims, 13 Drawing Sheets

(51) Int. Cl.
  *B32B 3/08* (2006.01)
  *A43C 11/00* (2006.01)
  *B32B 5/02* (2006.01)
  *D04B 21/20* (2006.01)
  *D04B 1/22* (2006.01)

(52) U.S. Cl.
  CPC ... *B32B 2437/02* (2013.01); *D10B 2403/0113* (2013.01); *D10B 2403/021* (2013.01); *D10B 2403/0241* (2013.01); *D10B 2501/043* (2013.01); *Y10T 428/24562* (2015.01); *Y10T 428/249921* (2015.04)

(56) References Cited

U.S. PATENT DOCUMENTS

| | | | |
|---|---|---|---|
| 4,785,558 | A | 11/1988 | Shiomura et al. |
| 4,863,776 | A * | 9/1989 | Sternlieb ............... B32B 5/06 112/420 |
| 5,149,583 | A | 9/1992 | Saarikettu |
| 5,475,904 | A | 12/1995 | Le Roy |
| 5,601,907 | A | 2/1997 | Matsumoto |
| 5,713,399 | A | 2/1998 | Collette et al. |
| 6,052,921 | A | 4/2000 | Oreck |
| 6,119,371 | A | 9/2000 | Goodwin et al. |
| 6,533,885 | B2 | 3/2003 | Davis et al. |
| 6,544,910 | B2 | 4/2003 | Himmelsbach et al. |
| 6,835,257 | B2 | 12/2004 | Perrine |
| 6,854,296 | B1 | 2/2005 | Miller, III |
| 6,910,288 | B2 | 6/2005 | Dua |
| 6,957,504 | B2 | 10/2005 | Morris |
| 7,076,891 | B2 | 7/2006 | Goodwin |
| 7,316,840 | B2 | 1/2008 | Neculescu et al. |
| 7,479,195 | B2 | 1/2009 | Leidig et al. |
| 7,568,298 | B2 | 8/2009 | Kerns |
| 7,718,249 | B2 | 5/2010 | Russell et al. |
| 7,776,171 | B2 | 8/2010 | Lehto et al. |
| 7,824,513 | B2 | 11/2010 | Chernyak et al. |
| 7,883,594 | B2 | 2/2011 | Albanese et al. |
| 8,056,287 | B2 | 11/2011 | Demello |
| 8,132,340 | B2 | 3/2012 | Meschter |
| 8,266,827 | B2 | 9/2012 | Dojan et al. |
| 8,312,645 | B2 | 11/2012 | Dojan et al. |
| 8,312,646 | B2 | 11/2012 | Meschter et al. |
| 8,800,172 | B2 | 8/2014 | Dua et al. |
| 8,881,430 | B2 | 11/2014 | Seamarks et al. |
| 8,887,410 | B2 | 11/2014 | Dojan et al. |
| 8,893,405 | B2 | 11/2014 | Dojan et al. |
| 9,132,601 | B2 * | 9/2015 | Beye ............... D04B 21/20 |
| 9,226,548 | B2 * | 1/2016 | Follet ............... D04C 1/12 |
| 2003/0046843 | A1 | 3/2003 | Chien |
| 2004/0181972 | A1 * | 9/2004 | Csorba ............... A43B 7/1495 36/50.1 |
| 2008/0110048 | A1 | 5/2008 | Dua et al. |
| 2008/0110049 | A1 * | 5/2008 | Sokolowski ...... A43B 3/0031 36/50.1 |
| 2010/0154256 | A1 | 6/2010 | Dua et al. |
| 2010/0186874 | A1 | 7/2010 | Sussmann |
| 2010/0192410 | A1 | 8/2010 | Marvin et al. |
| 2010/0251564 | A1 | 10/2010 | Meschter |
| 2010/0323148 | A1 | 12/2010 | Lafond et al. |
| 2011/0192058 | A1 * | 8/2011 | Beers ............... A43B 3/001 36/137 |
| 2011/0192059 | A1 * | 8/2011 | Spanks ............... A43B 1/0072 36/137 |
| 2012/0023778 | A1 | 2/2012 | Dojan et al. |
| 2012/0198727 | A1 | 8/2012 | Long |
| 2012/0233882 | A1 * | 9/2012 | Huffa ............... A43B 1/04 36/45 |
| 2013/0019500 | A1 * | 1/2013 | Greene ............... A43B 23/025 36/50.1 |
| 2013/0145652 | A1 * | 6/2013 | Podhajny ........... A43B 23/0245 36/50.1 |
| 2014/0068968 | A1 * | 3/2014 | Podhajny ........... A43B 23/0245 36/50.1 |
| 2014/0196310 | A1 | 7/2014 | Beye et al. |
| 2014/0196311 | A1 | 7/2014 | Follet et al. |
| 2014/0196315 | A1 | 7/2014 | Beye et al. |

FOREIGN PATENT DOCUMENTS

| | | |
|---|---|---|
| EP | 1055757 A1 | 11/2000 |
| EP | 1184499 A1 | 3/2002 |
| EP | 1367913 B1 | 2/2008 |
| WO | 9003744 A1 | 4/1990 |
| WO | 2012015588 A1 | 2/2012 |

OTHER PUBLICATIONS

International Preliminary Report on Patentability and Written Opinion for Application No. PCT/US2014/011387, mailed on Jul. 21, 2015.

International Preliminary Report on Patentability and Written Opinion for Application No. PCT/US2014/011389, mailed on Jul. 21, 2015.

International Preliminary Report on Patentability and Written Opinion for Application No. PCT/US2014/011392, mailed on Jul. 21, 2015.

International Search Report and Written Opinion for Application No. PCT/US2014/011386 mailed on Jul. 4, 2014, 4 pages.

International Search Report and Written Opinion for Application No. PCT/US2014/011387 mailed on Jun. 30, 2014, 3 pages.

International Search Report and Written Opinion for Application No. PCT/US2014/011389 mailed on Jul. 15, 2014, 5 pages.

International Search Report and Written Opinion for Application No. PCT/US2014/011392, mailed on Nov. 6, 2014.

Office Action mailed Feb. 2, 2015, for U.S. Appl. No. 13/741,428.

Notice of Allowance mailed Sep. 14, 2015 in U.S. Appl. No. 13/741,435.

Notice of Allowance mailed Sep. 1, 2015 in U.S. Appl. No. 13/741,440.

Office Action mailed Apr. 23, 2015, for U.S. Appl. No. 13/741,440.

Office Action mailed Apr. 22, 2015 in U.S. Appl. No. 13/741,435.

* cited by examiner

SPACER TEXTILE MATERIAL WITH TENSILE STRANDS HAVING MULTIPLE ENTRY AND EXIT POINTS

CROSS-REFERENCE TO RELATED APPLICATIONS

This application is a continuation of Beye et al., U.S. Pat. No. 9,132,601, U.S. Patent Publication Number 2014/0196314, now U.S. patent application Ser. No. 13/741,428, filed Jan. 15, 2013 and titled "Spacer Textile Material With Tensile Strands Having Multiple Entry and Exit Points," the entirety of which is herein incorporated by reference.

RELATED APPLICATIONS

This application is related to the following commonly owned co-pending applications: Follett, U.S. Pat. No. 9,095,186, issued Aug. 4, 2015, and titled "Article of Footwear Incorporating Braided Tensile Strands"; Beye et al., U.S. Patent Application Publication Number 2014/0196310, now U.S. patent application Ser. No. 13/741,433, filed Jan. 15, 2013, and titled "Spacer Textile Material with Tensile Strands in Non-Linear Arrangements"; Beye et al., U.S. Patent Application Publication Number 2014/0196315, now U.S. patent application Ser. No. 13/741,435, filed Jan. 15, 2013, and titled "Spacer Textile Material with Strands that Intersect"; and Follett et al., U.S. Patent Application Publication Number 2014/0196311, now U.S. patent application Ser. No. 13/741,440, filed Jan. 15, 2013, and titled "Spacer Textile Material with Channels Having Multiple Strands," which are all incorporated by reference herein in their entireties.

BACKGROUND

Articles of footwear generally include two primary elements: an upper and a sole structure. The upper is often formed from a plurality of material elements (e.g., textiles, polymer sheet layers, foam layers, leather, synthetic leather) that are stitched or adhesively bonded together to form a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust the fit of the footwear, as well as permitting entry and removal of the foot from the void within the upper. In addition, the upper may include a tongue that extends under the lacing system to enhance adjustability and comfort of the footwear, and the upper may incorporate a heel counter.

The various material elements forming the upper impart specific properties to different areas of the upper. For example, textile elements may provide breathability and may absorb moisture from the foot, foam layers may compress to impart comfort, and leather may impart durability and wear-resistance. As the number of material elements increases, the overall mass of the footwear may increase proportionally. The time and expense associated with transporting, stocking, cutting, and joining the material elements may also increase. Additionally, waste material from cutting and stitching processes may accumulate to a greater degree as the number of material elements incorporated into an upper increases. Moreover, products with a greater number of material elements may be more difficult to recycle than products formed from fewer material elements. By decreasing the number of material elements, therefore, the mass of the footwear and waste may be decreased, while increasing manufacturing efficiency and recyclability.

The sole structure is secured to a lower portion of the upper so as to be positioned between the foot and the ground. In athletic footwear, for example, the sole structure includes a midsole and an outsole. The midsole may be formed from a polymer foam material that attenuates ground reaction forces (i.e., provides cushioning) during walking, running, and other ambulatory activities. The midsole may also include fluid-filled chambers, plates, moderators, or other elements that further attenuate forces, enhance stability, or influence the motions of the foot, for example. The outsole forms a ground-contacting element of the footwear and is usually fashioned from a durable and wear-resistant rubber material that includes texturing to impart traction. The sole structure may also include a sockliner positioned within the upper and proximal a lower surface of the foot to enhance footwear comfort.

SUMMARY

In one aspect, a spacer textile material includes a first layer, a second layer, a plurality of connecting members extending between and joining the first layer and the second layer and a tensile strand, where a first portion of the tensile strand is disposed between the first layer and second layer. The spacer textile material also includes a channel bounded by portions of the first layer and the second layer that are in direct contact. The first portion of the tensile strand that is disposed between the first layer and second layer is located within the channel.

In another aspect, a spacer textile material includes a first layer, a second layer, a plurality of connecting members extending between and joining the first layer and the second layer, and a tensile strand. The spacer textile material also includes a channel bounded by portions of the first layer and the second layer that are in direct contact. A first portion of the tensile strand is disposed between the first layer and the second layer in the channel, a second portion of the tensile strand extends outside of the spacer textile material from an edge of the spacer textile material and a third portion of the tensile strand extends outwardly from a first opening on the outer face of the first layer of the spacer textile material.

In another aspect, an article of footwear includes an upper, where at least a portion of the upper comprises a spacer textile material. The spacer textile material further includes a first layer, a second layer and a plurality of connecting members extending between and joining the first layer and the second layer as well as a tensile strand. The spacer textile material also includes a channel configured to receive at least a portion of the tensile strand.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
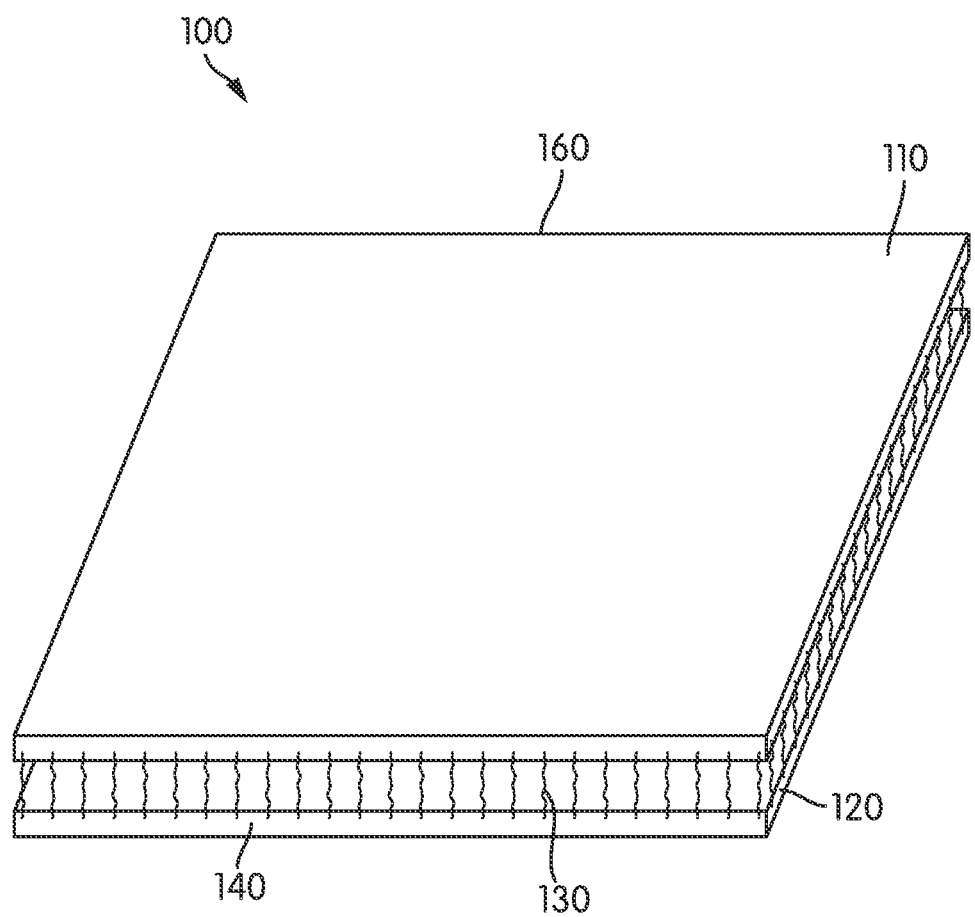
FIG. 1 is a schematic view of an embodiment of the spacer textile material.

FIG. 1 illustrates an embodiment of a spacer textile material 100. In one embodiment, spacer textile material 100 may include a first layer 110, as well as a second layer 120 that is at least partially coextensive with first layer 110. In addition, spacer textile material 100 may have a plurality of connecting members 130 that extend between and join first layer 110 and second layer 120.

Connecting members 130 may be arranged to form a series of rows. The rows of connecting members 130 are separated by various spaces. In some embodiments, the rows formed by connecting members 130 may be substantially parallel to each other and distributed at substantially equal distances across spacer textile material 100. In other embodiments, the rows could be non-parallel and/or unevenly spaced apart. Spaces may be areas within spacer textile material 100 where connecting members 130 are absent. Typically, spaces may include areas between the rows formed by connecting members 130.

Spacer textile material 100 also may define at least a pair of opposite edges, first edge 140 and second edge 160, which are also edges of first layer 110 and second layer 120. In some embodiments, each of first edge 140 and second edge 160 may be substantially parallel to the rows formed by connecting members 130.

The spacer textile material may be formed by any suitable method for manufacturing such a material. A general process may include one or more yarns being fed into a conventional knitting apparatus. The knitting apparatus may mechanically manipulate yarns to form each of a first layer and a second layer. The knitting apparatus may also manipulate yarns to form connecting members between the first and second layers. As such, the first layer and second layer may be knitted layers, and the connecting members may be sections of at least one yarn that extend between the first layer and second layer. Moreover, the process forms spaces, edges, and stabilization structures.

Once formed, the spacer textile material exits the knitting apparatus and is collected on a roll. After a sufficient length of spacer textile material is collected, the roll may be shipped or otherwise transported to a manufacturer to utilize the spacer textile material for the manufacture of footwear or for any other purposes. Although not always performed, the spacer textile material may be subjected to various finishing operations (e.g., dying, fleecing) prior to being collected on a roll.

Examples of spacer textile material and methods of making spacer textile material are disclosed in any of the following: Chao et al., U.S. Patent Publication Number 2013/0266773, entitled, "Spacer Textile Materials and Methods for Manufacturing the Spacer Textile Materials," published on Oct. 10, 2013, (now U.S. patent application Ser. No. 13/443,421, filed on Apr. 10, 2012); Goodwin et al., U.S. Pat. No. 6,119,371, entitled "Resilient Bladder for Use in Footwear," issued on Sep. 19, 2000; and Goodwin, U.S. Pat. No. 7,076,891, entitled "Flexible Fluid-Filled Bladder for an Article of Footwear," issued on Jul. 18, 2006, the entirety of each being incorporated by reference.

Some embodiments of a spacer textile material may include a tensile strand. In some embodiments, one or more portions of the tensile strand may be located between the first layer and the second layer. In some embodiments, one or more portions of the tensile strand may be disposed in channels that may be created by joining a first layer and second layer of the spacer textile material. After assembly, the tensile strand may move freely within the one or more channels.

Figure 2:
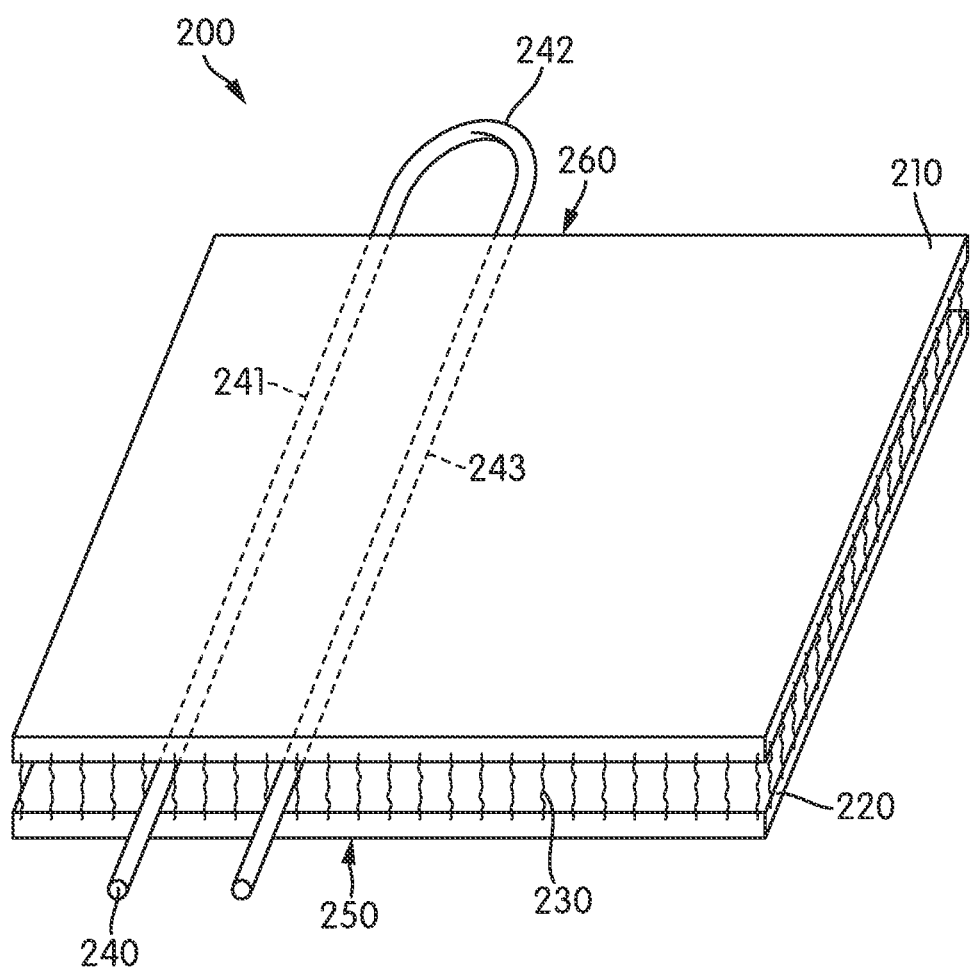
FIG. 2 is a schematic view of an embodiment of the spacer textile material having a tensile strand disposed between a first layer and a second layer.

As discussed above, the spacer textile material may include at least one tensile strand. The tensile strand may be located in any portion of the spacer textile material. FIG. 2 shows an embodiment of a spacer textile material 200. Spacer textile material 200 may include tensile strand 240. Further, spacer textile material 200 may include a plurality of connecting members 230 that extend between and join first layer 210 and second layer 220. Connecting members 230 may be arranged to form a series of rows that are separated by various spaces. A portion of tensile strand 240 may be disposed between first layer 210 and second layer 220. In particular, tensile strand 240 may be disposed in the space created between connecting members 230.

Spacer textile material 200 also defines at least a pair of opposite edges, first edge 250 and second edge 260. First edge 250 and second edge 260 also may be edges of first layer 210 and second layer 220. In some embodiments, each of first edge 250 and second edge 260 may be substantially parallel to the rows formed by connecting members 230. However, in other embodiment, first edge 250 and/or second edge 260 may not be parallel with the rows formed by connecting members 230.

In different embodiments, the arrangement of a tensile strand within a spacer textile material can vary. For example, various portions of a tensile strand may extend through spacer textile material (i.e., between a first layer and a second layer) in parallel with, or at various angles to, one or more edges of the spacer textile material. Additionally, in some embodiments, different portions or segments of a tensile strand may be aligned in parallel with one another. In other embodiments, different portions or segments of a tensile strand could be disposed at various angles to one another.

An exemplary arrangement of a tensile strand within a spacer textile material is shown in FIG. 2. In the embodiment shown in FIG. 2, a first portion 241 of tensile strand 240 may be disposed between first layer 210 and second layer 220 of spacer textile material 200. Moreover, first portion 241 may generally extend from first edge 250 to second edge 260. In addition, a third portion 243 of tensile strand 240 may also be disposed between first layer 210 and second layer 220 of spacer textile material 200 and may likewise extend between first edge 250 and second edge 260. Furthermore, a second portion 242 of tensile strand 240 may be disposed between first portion 241 and third portion 243. In contrast to first portion 241 and third portion 243, which may be disposed between adjacent layers of spacer textile material 200, second portion 242 may extend outwardly from second edge 260 such that second portion 242 is not disposed between first layer 210 and second layer 220. In some embodiments, second portion 242 forms a loop that extends from second edge 260 of spacer textile material 200.

As one exemplary arrangement, first portion 241 and third portion 243 are shown extending in parallel between first edge 250 and second edge 260. Moreover, first portion 241 and third portion 243 may be oriented in a direction that is approximately perpendicular to first edge 250 and second edge 260. However, as previously discussed, in other embodiments one or more portions could vary in their orientations relative to other portions of a tensile strand and/or could vary in their orientations relative to edges of a spacer textile material.

The tensile strands of the disclosure may be formed from any generally one-dimensional material. As utilized with respect to the present disclosure, the term "one-dimensional material" or variants thereof is intended to encompass generally elongate materials exhibiting a length that is substantially greater than a width and a thickness.

The tensile strands of the disclosure may be formed from any suitable material. Accordingly, suitable materials for a tensile strand, for example tensile strand 240 of FIG. 2, may include various filaments, fibers, yarns, threads, cables, cords, or ropes. Suitable material for a tensile strand may be formed from or include rayon, nylon, polyester, polyacrylic, silk, cotton, carbon, glass, aramids (e.g., para-aramid fibers and meta-aramid fibers), ultra high molecular weight polyethylene, liquid crystal polymer, copper, aluminum, steel, and various combination of these kinds of materials.

Filaments have an indefinite length and in some cases a single filament can be utilized as a tensile strand, such as tensile strand 240. Fibers have a relatively short length and generally go through spinning or twisting processes to produce a strand of suitable length. An individual filament utilized in a tensile strand may be formed from a single material (i.e., a monocomponent filament) or from multiple materials (i.e., a bicomponent filament). Similarly, different filaments may be formed from different materials. As an example, yarns utilized as tensile strand 240 may include filaments that may be formed from a common material, or may include filaments that may be formed from two or more different materials. Similar concepts also apply to threads, cables, or ropes.

The spacer textile material of the disclosure may include two or more tensile strands. In some embodiments, when the spacer textile material includes multiple tensile strands, the tensile strands may be made from the same material. In some embodiments, the tensile strands may be made from different materials. When the tensile strands are made from different materials, the tensile strands may include different characteristics. For example, a first tensile strand may stretch when a force is applied. In some embodiments, a second tensile strand may stretch less than first tensile strand. In other embodiments, a second tensile strand may stretch more than the first tensile strand.

In some embodiments, the thickness of tensile strands may also vary significantly to range from less than 0.03 millimeters to more than 5 millimeters, for example. Although one-dimensional materials will often have a cross-section where the width and the thickness are substantially equal (e.g., a round or square cross-section), some one-dimensional materials may have a width that is greater than a thickness (e.g., a rectangular, oval, or otherwise elongate cross-section). Despite the greater width, a material may be considered one-dimensional if the length of the material is substantially greater than the width and the thickness of the material.

In some embodiments having multiple tensile strands, the thickness of each strand may be the same. In other embodiments, the thickness of each tensile strand may be different. The relative thickness of two or more tensile strands may be selected according to various factors including desired strength, elasticity, manufacturing considerations as well as possible other factors.

Examples of suitable tensile strands are disclosed in any of the following: Dojan et al., U.S. Pat. No. 8,925,129, entitled, "Methods of Manufacturing Articles of Footwear With Tensile Strand Elements," issued on Jan. 6, 2015; Dojan et al., U.S. Pat. No. 8,819,963, entitled, "Articles of Footwear With Tensile Strand Elements," issued on Sep. 2, 2014; and Dojan et al., U.S. Pat. No. 8,973,288, entitled "Footwear Incorporating Angled Tensile Strand Elements," issued on Mar. 10, 2015, the entirety of each being hereby incorporated by reference.

A tensile strand can be configured in any pattern, configuration or arrangement in a spacer textile material. In some embodiments, a tensile strand can be confined to a particular region of a spacer textile material. In other embodiments, a tensile strand may be associated with multiple different regions of a spacer textile material, including the entirety of the spacer textile material. Moreover, a tensile strand can extend through a spacer textile material (i.e., between adjacent layers), as well as outside of the layers that form the spacer textile material. In some embodiments, portions of a tensile strand may extend along an outer surface or outer face of a layer. In still other embodiments, portions of a tensile strand could extend along an edge of a spacer textile material.

For purposes of this disclosure, the term "opening" may include a space along an edge of the spacer textile material between a first layer and a second layer that is also between connecting members of the spacer textile material. Further, the term "opening" may include a space between the knitted strands of the first layer or second layer of the spacer textile. Further, the term "opening" may include a space, slit or hole in the first layer or second layer created during the preparation of the spacer textile material. As stated above, the tensile strand may be disposed through any opening on the spacer textile material.

The figures of this disclosure may show the ends of each tensile strand extending beyond the edges or faces of one or more layers of the spacer textile material. However, the ends of each tensile strand may be finished in any suitable manner. For example, in some embodiments, the tensile strand ends may extend beyond the edge of the spacer material. In such an embodiment, the ends of the tensile strand may extend into a second material or structure. Further, the ends of the tensile strand may be knotted or tied off so that the ends may not recess into the spacer textile material. Further, the ends may extend into the spacer textile material in a second direction and continue to extend throughout the material in a selected manner or pattern. In other embodiments, the ends of the tensile strand may be flush with the edge of the spacer textile material. Still further, the end of the tensile strand may be joined to the edge of one or more layers of the spacer textile material.

In addition to a tensile strand, the spacer textile material may include provisions for restricting the movement of the tensile strand within the spacer textile material. In some embodiments, a spacer textile material can include provisions for restricting the movement of one portion of the tensile strand. In other embodiments, a spacer textile material can include provisions for restricting two or more portions of a tensile strand (for example, two adjacent sides or ends of a tensile strand). In some embodiments, a spacer textile material can include one or more channels that act to restrict or restrain the movement various portions of the tensile strand. For example, a tensile strand disposed inside a channel of a spacer textile material may move freely in a longitudinal direction of the channel, while motion of the tensile strand in the lateral direction of the channel may be restricted.

Figure 5:
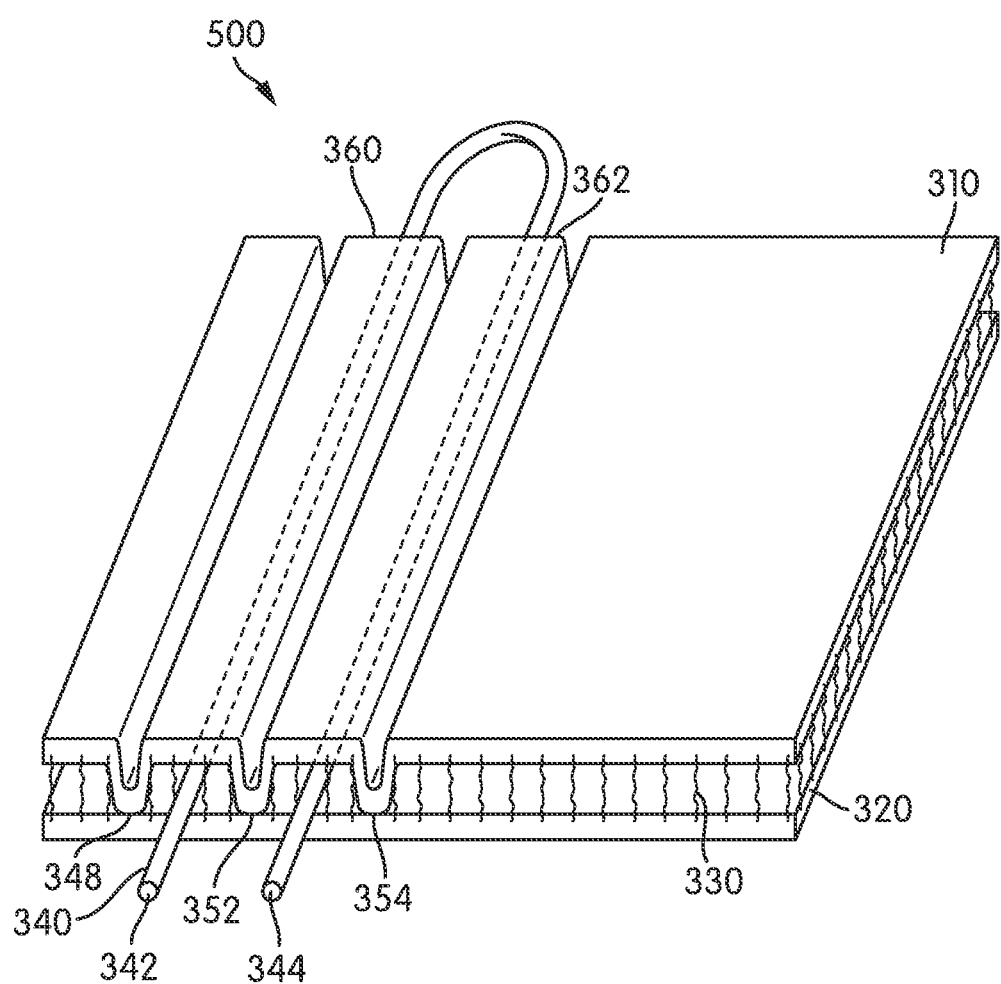
FIG. 5 is a schematic view of an embodiment of the spacer textile material having a tensile strand disposed in channels defined by one or more welds created by a welding method.

For instance, FIG. 5, which is discussed below is further detail, depicts spacer textile material 500 having portions of a tensile strand disposed within spacer textile material 500. Portions of a tensile strand may be further disposed in two channels, first channel 360 and second channel 362. As shown in FIG. 5, the tensile strand portions may be restricted in the lateral direction on both sides while the tensile strand portions are free to move within each channel in the longitudinal direction.

The channels formed in the spacer textile material may have any width. In some embodiments the width of the channel may accommodate one tensile strand. In other embodiments, the width of the channel may be large enough to accommodate two or more tensile strands. In addition, a first channel may have one width and a second channel may have a second width. The widths of multiple channels may be the same or the widths may be different. Further, the width of a single channel may change over the run of the channel. In other words, the width of the channel may vary throughout the length of the channel. For example, a channel may have a width that increases from a first edge to a second edge of a spacer textile material.

In some embodiments, channels of a spacer textile material may be bounded by portions of the first layer and the second layer that are in direct contact. In some embodiments, sections of the first layer and the second layer may be joined or fused to form one or more channels. The first layer may be joined to the second layer by any suitable method of joining such layers. In some embodiments, the first layer is joined to the second layer through a welding method. However, in other embodiments, the joining of the first layer and the second layer could be accomplished using other methods including, but not limited to: stitching, adhesives as well as other joining methods.

In some embodiments, the first layer and the second layer could be joined in a manner that forms one or more channels for guiding and controlling the configuration and possible motions of a tensile strand. For example, in some embodiments one or more welds could be used to join the first layer and the second layer such that adjacent welds form the walls of one or more channels.

In some embodiments, welding methods may be utilized to join the first layer to the second layer. The welding method utilized to join the first layer to the second layer may include a high frequency welding method. In some embodiments, the high frequency welding method may include an ultrasonic welding method or a radio frequency welding method.

In those embodiments that include ultrasonic welding methods, an ultrasonic welding device is used to join the first layer to the second layer of the spacer textile material. Ultrasonic welding devices utilize high frequency ultrasonic acoustic vibrations. The vibrations may be applied locally to a portion of the spacer textile material. Further, the vibrations applied to the spacer textile material cause friction. The friction softens the spacer textile material to fuse the first layer to the second layer. The fusion of the first layer to the second layer may be considered a solid state weld.

Examples of ultrasonic techniques and equipment are disclosed in any of the following: Albanese et al., U.S. Pat. No. 7,883,594, entitled "Wrapped pile weatherstripping and methods of making same," issued on Feb. 8, 2011; Chernyak, U.S. Pat. No. 7,824,513, entitled "Apparatus and method for making pile articles and improved pile articles made therewith," issued on Nov. 2, 2010; Lehto et al., U.S. Pat. No. 7,776,171, entitled "Arrangement and method for treatment of a material by means of an ultrasonic device," issued on Aug. 17, 2010; Perrine, U.S. Pat. No. 6,835,257, entitled "Ultrasonic weld pattern for adsorbent containing package" issued on Dec. 28, 2004; and Collette et al., U.S. Pat. No. 5,713,399, entitled "Ultrasonic seaming of abutting strips for paper machine clothing" issued on Feb. 3, 1998; the entirety of each being hereby incorporated by reference. One or more of the principles, concepts or methods disclosed in the cited references above may be implemented for preparing the welds on the spacer textile material of this disclosure.

Figure 3:
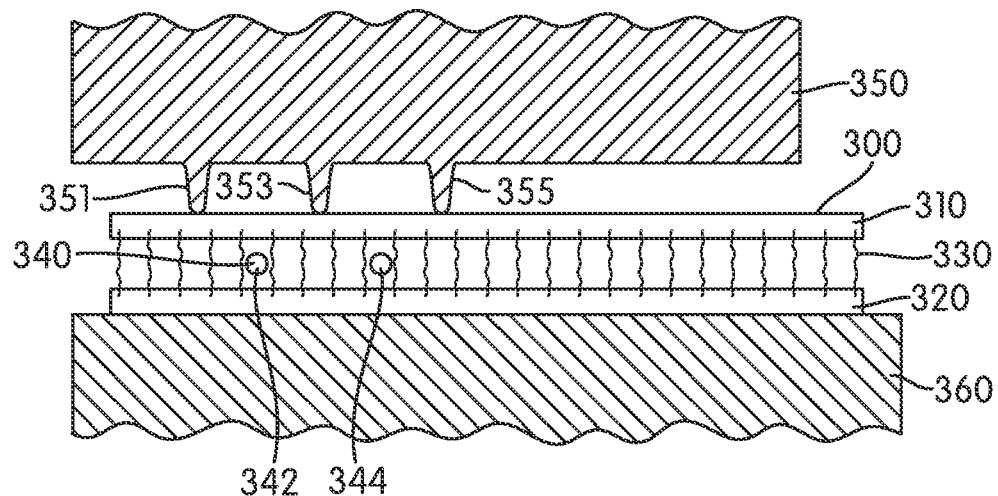
FIG. 3 is a schematic view of an embodiment of the spacer textile material having a tensile strand in a welding device prior to the joining of the first layer and second layer.

FIG. 3 shows an embodiment of spacer textile material 300 in a welding device. Spacer textile material 300 may include first layer 310, second layer 320 and connecting members 330. Spacer textile material 300 may further include a tensile strand 340 with first end 342 and second end 344. Tensile strand 340 may be located between first layer 310 and second layer 320.

In order to fuse portions of first layer 310 and second layer 320 together, spacer textile material 300 having tensile strand 340 may be positioned between a horn 350 and an anvil 360 of the welding device. As seen in FIG. 3, horn 350 may have a one or more protrusions. In some embodiments, horn 350 may have first protrusion 351, second protrusion 353, and third protrusion 355.

Each protrusion may form a pattern that is to be welded into the spacer textile material. The protrusions may form any suitable pattern. The patterns formed by one or more protrusions may include a stripe or line, parallel stripes or lines, perpendicular stripes or lines, a zig-zag pattern, a triangular pattern, and a wavy pattern, among other patterns.

For purposes of illustration, horn 350 and anvil 360 are shown schematically in the embodiments. Generally, the anvil 360 is a fixed component where the material to be welded rests or is nested. The horn 350 may be a sonotrode, which is connected to a transducer (not shown). The transducer causes the horn 350 to resonate or emit an acoustic vibration. In some embodiments, the frequency at which a horn vibrates may be between about 15 kHz and 85 kHz. Some examples of typical frequencies at which a horn vibrates include 15 kHz, 20 kHz, 30 kHz, 35 kHz, 40 kHz, and 70 kHz. The frequency chosen may depend on the material being welded as well as possibly other factors.

Horn 350 and anvil 360 come together under pressure to join a first material to a second material. In the embodiments shown in FIGS. 3 and 4, a first layer 310 is joined to a second layer 320 of spacer textile material 300. First layer 310 may be joined to second layer 320 in the location in which the material comes in contact with one or more of the protrusions, including first protrusion 351, second protrusion 353, and third protrusion 355, of horn 350.

Figure 4:
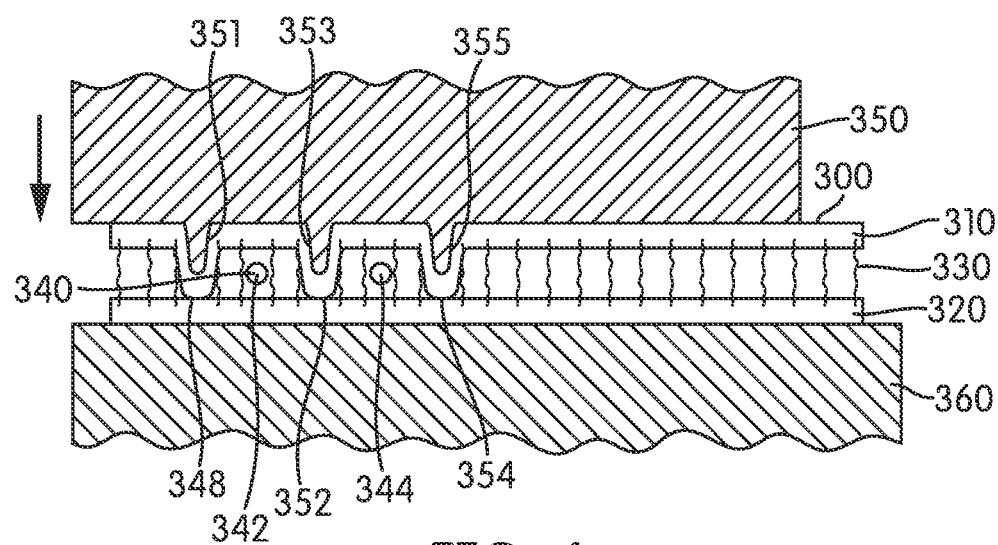
FIG. 4 is a schematic view of an embodiment of a welding device during the joining of the first layer and second layer of a spacer textile material having a tensile strand disposed between a first layer and a second layer.

FIG. 4 provides a schematic of an embodiment of an ultrasonic welding method. In FIG. 4, first protrusion 351, second protrusion 353 and third protrusion 355 of horn 350 cause first layer 310 to meet second layer 320 at first weld 348, second weld 352 and third weld 354. The transducer may be activated to cause horn 350 to resonate at a selected frequency. The vibrations of horn 350 generate friction between first layer 310 and second layer 320 of spacer textile material 300 and horn 350. The friction causes the materials of first layer 310 and second layer 320 to soften or melt. First layer 310 and second layer 320 may be allowed to cool to cause the layers to fuse to each other. Following this joining process, first layer 310 and second layer 320 may be fused or welded in those areas contacted by horn 350.

FIG. 5 depicts an embodiment of the welded spacer textile material 500. As can be seen, first weld 348, second weld 352 and third weld 354 may be generated by a welding device, as shown in FIG. 4. At each weld, first layer 310 may be fused to second layer 320. Further, first weld 348, second weld 352, and third weld 354 define two channels, first channel 360 and second channel 362. Both channels include portions of tensile strand 340. Tensile strand 340 is free to move in a longitudinal direction within the channels. However, the welds on both sides of tensile strand 340 restrain the lateral movement of tensile strand 340 within each channel of the spacer textile material 500.

Figure 14:
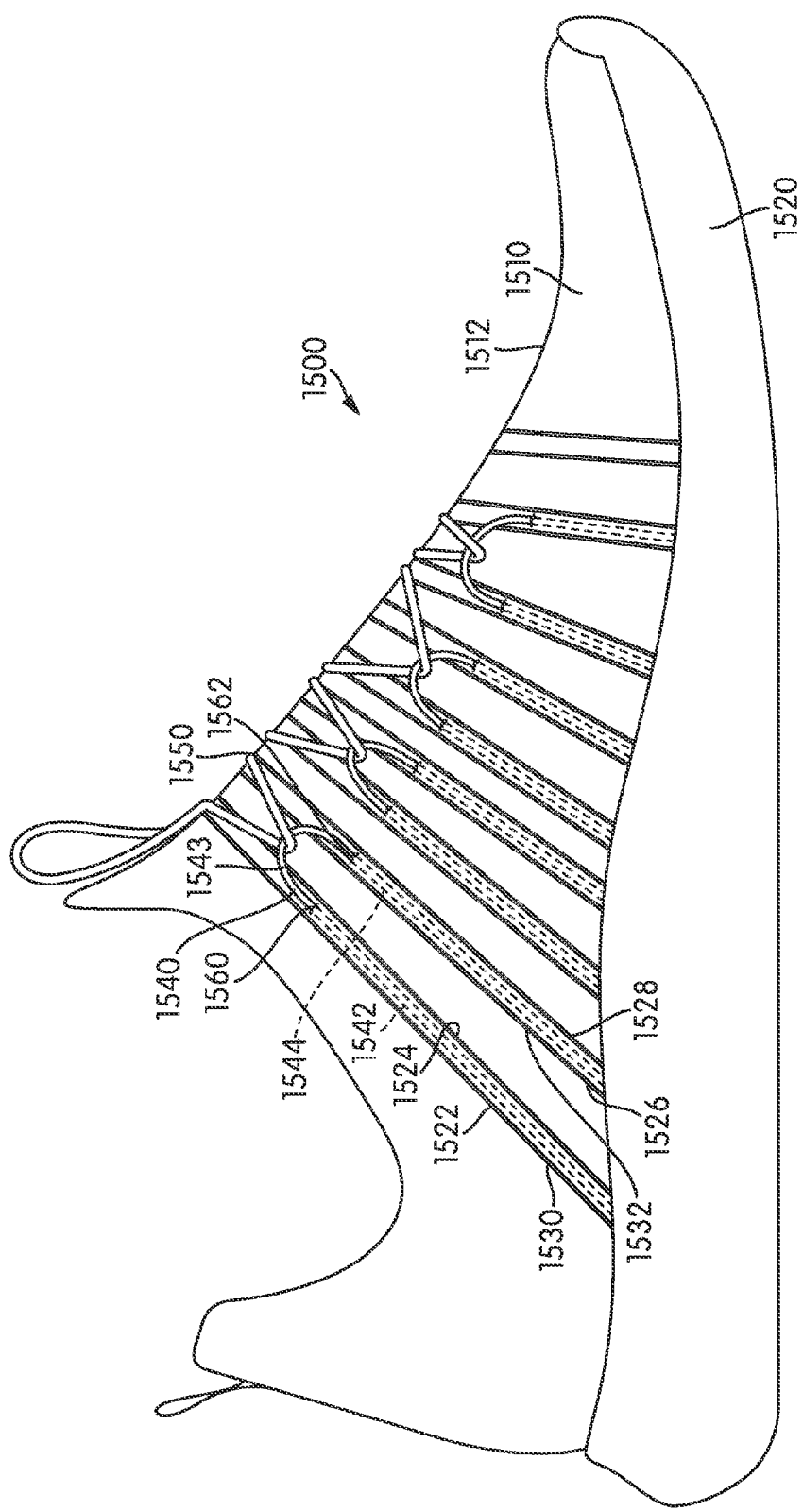
FIG. 14 is a schematic view of an embodiment of an article of footwear incorporating a spacer textile material having tensile strands in any location as a portion of the upper of the article of footwear.

In some embodiments, the welded spacer textile material, or a portion of the welded spacer textile material, may be incorporated into footwear, for example, as shown in FIG. 14, discussed below in further detail. In some cases, the spacer textile material may be configured for use in a wide range of athletic footwear styles, including running shoes, basketball shoes, cross-training shoes, football shoes, golf shoes, hiking shoes and boots, ski and snowboarding boots, soccer shoes, tennis shoes, and walking shoes, for example. Concepts associated with the spacer textile material may also be utilized with footwear styles that are generally considered to be primarily non-athletic, including dress shoes, loafers, sandals, casual shoes, clogs, flats, heels, pumps, wedges, and work boots.

In addition to footwear, the spacer textile material may be incorporated into other types of apparel and athletic equipment, including helmets, gloves, and protective padding for sports, such as football and hockey. Similar material may also be incorporated into cushions and other compressible structures utilized in household goods and industrial products.

Additionally, the discussion and figures disclose various configurations of a spacer textile material. Although portions of the spacer textile material are disclosed as being incorporated into footwear, the spacer textile material may be utilized with a variety of other products or for a variety of other purposes. In some embodiments, the spacer textile material may be utilized in apparel, such shirts, shorts, pants, outerwear, sports uniforms/jerseys, hats, socks, and undergarments, among other pieces of apparel.

The welding method described above is not restricted to the patterns described in this disclosure. The welding device may be configured to prepare a spacer textile material with a wide variety of patterns and textures.

The spacer textile material may be formed from any suitable material. In some embodiments, the material used in making a spacer textile material may be suitable for the joining method utilized to join the first layer to the second layer of the spacer textile material.

In those embodiments where an ultrasonic welding method is utilized to join the first layer and second layer of the spacer textile material, the spacer textile material may be made of any material suitable for such a spacer textile configuration. Further, the spacer textile material may be made of any material suitable for high frequency welding methods. Materials suitable for high frequency welding include thermoplastic material or natural material coated with a thermoplastic material. Examples of material suitable for high frequency welding methods include an acrylic, a nylon, a polyester, a polylactic acid, a polyethylene, a polypropylene, polyvinyl chloride (PVC), an urethane, a natural fiber, such as cotton or wool, that is coated with one or more thermoplastic materials, such as an ethyl vinyl acetate or thermoplastic polyurethane, and combinations thereof.

In some embodiments, the first layer and the second layer of a spacer textile material may be made of the same material or combination of materials. In other embodiments, the first layer may be made of one suitable material or combination of materials, and the second layer may be made of a second suitable material or combination of materials that are different from the first layer.

Further, the connecting members of the spacer textile material may be made of any suitable material. In some embodiments, the material of the connecting member may be the same as the material of the first layer. In other embodiments, the material of the connecting members may be the same as the material of the second layer. In still further embodiments, the material of the connecting members may be substantially different than both the material of the first layer and the material of the second layer.

Other welding methods may be utilized to join layers of a spacer textile material. For example, in some embodiments a radio frequency (RF) welding method could be used. In some embodiments, radio frequency welding could be used with a hot melt adhesive. In some cases, the use of a hot melt adhesive may enhance the application of RF welding to a low mass spacer textile material.

Welding methods could also be used with a variety of different materials. In some embodiments, materials having desired channel geometry can be achieved by selecting a combination of a welding method and a suitable material or materials. For example, some embodiments could use thermoplastic polyurethane (TPU) in combination with ultrasonic welding to achieve the desired channel geometry on a portion of an upper or other section of an article.

Still other methods are possible for joining layers of a spacer textile material. As one example, in other embodiments, the first layer may be joined to the second layer by a thermal fusion method. The thermal fusion method may include heat bonding. Heat bonding methods include hot die heating, steam heating or hot air heating.

In further embodiments, the first layer may be joined to the second layer through stitching methods or weaving methods. In some embodiments, where the layers are joined through stitching methods, the material used to form the stitch may be the same as the material of the first layer or second layer. In other embodiments, the materials used to form the stitch may be a different material from both the first layer and the second layer of the spacer textile material.

It will be understood that the embodiments are not limited to any particular method for forming channels in a spacer textile material. In particular, the embodiments depict various configurations of a spacer textile material that allows for tensile strands (such as wires) to be captured and guided through various channels. Although the following embodiments may reference welding or welds used to join regions of layers in a spacer textile material, it should be understood that in other embodiments the regions of joined material could be created using stitching, gluing, as well as possibly other methods.

One or more tensile strands and/or associated channels could be arranged in a variety of configurations within a spacer textile material. As stated above, portions of the tensile strand may enter or exit the spacer textile material at any point on the material. Further, the tensile strands, and channels in which the tensile strands are disposed, may be arranged in any pattern including, but not limited to: linear patterns, non-linear patterns, regular patterns, irregular patterns as well as any other patterns.

FIGS. 6 through 13 illustrate various different configurations or arrangements of one or more tensile members in a spacer textile material. It will be understood that the following configurations are only intended to be exemplary and still other configurations may be possible in other embodiments. Moreover, features of the different embodiments may be combined to create still further arrangements for one or more tensile strands within a spacer textile material.

Figure 6:
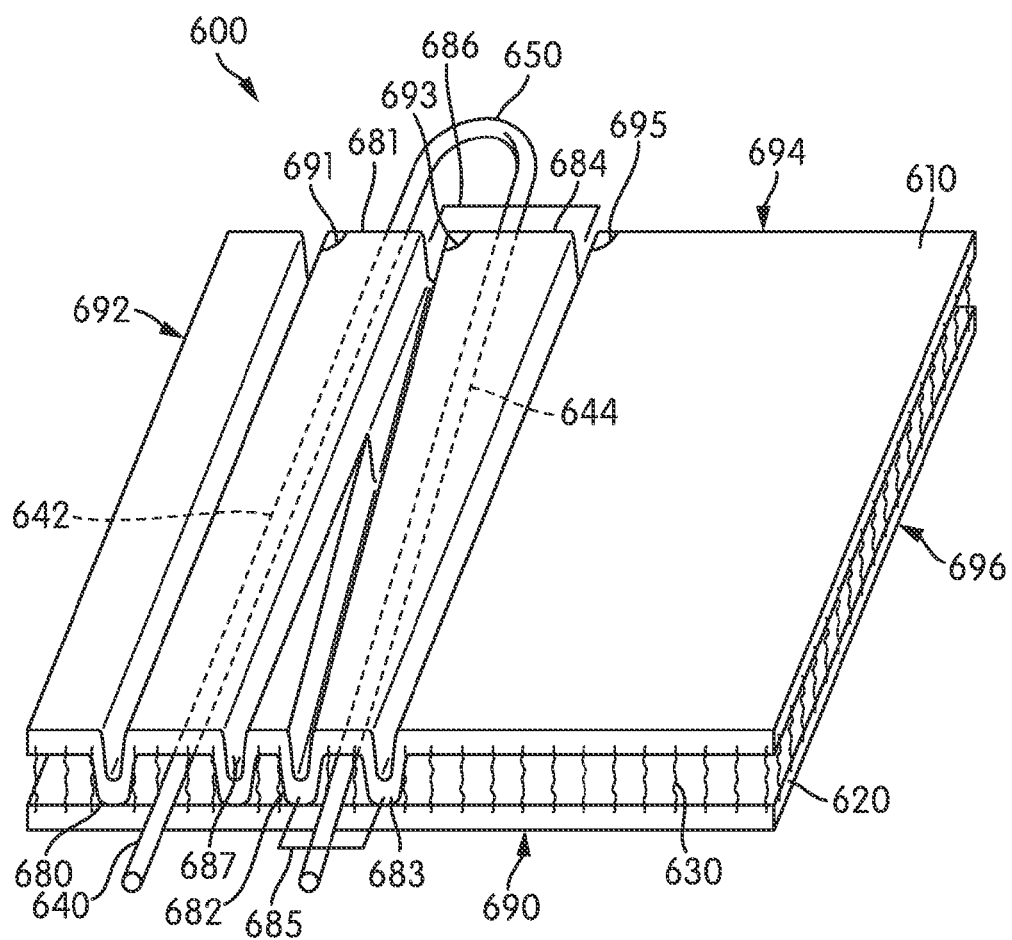
FIG. 6 is a schematic view of an embodiment of the spacer textile material having a tensile strand where the tensile strand is disposed between a first layer and a second layer and extends from the material along one or more edges of the material.

FIG. 6 is an embodiment in which multiple portions of the tensile strand extend from and through the spacer textile material. A spacer textile material may include provisions for controlling the orientation of a tensile strand, which may allow the direction of the tension to be better controlled through the material. When a spacer textile material is incorporated into an upper for an article of footwear, for example, these features may help control the tension through a portion of the upper.

As shown in FIG. 6, a tensile strand 640 may be disposed between first layer 610 and second layer 620 of a spacer textile material 600. Further, spacer textile material 600 may include a plurality of connecting members 630 that extend between and join first layer 610 and second layer 620.

Spacer textile material 600 of FIG. 6 also may have four edges, first edge 690, second edge 692, third edge 694 and fourth edge 696, which are also edges of first layer 610 and second layer 620. Portions of tensile strand 640 may be disposed between first layer 610 and second layer 620 and in the space created between connecting members 630.

In some embodiments, portions of spacer textile material 600 may be welded together using methods such as those described above. Spacer textile material 600 may include first weld 680, second weld 687, third weld 682 and fourth weld 683. During the welding method, first weld 680, second weld 687, third weld 682, and fourth weld 683 may have been formed in spacer textile material 600. First weld 680, second weld 687, third weld 682, and fourth weld 683 form two channels, first channel 681 and second channel 684, in the spacer textile material 600. Portions of tensile strand 640 run through each of the two channels.

The channels of spacer textile material 600 may have substantially different widths. For example, first channel 681 may be of a uniform width that is different from the width of second channel 684. In addition, the width of channel 684 may vary between first edge 690 and third edge 694. More specifically, second channel 684 may have a first width 685 adjacent first edge 690 and a second width 686 adjacent third edge 694 that is substantially greater than the first width 685.

The width of each channel may be defined by the welds forming the channel. In some embodiments, the welds forming the channel run parallel to each other. For example, first weld 680 and second weld 687 run generally parallel to each other. More specifically, first weld 680 may form a first angle 691 with third edge 694 of spacer textile material 600. In one embodiment, first angle 691 may be approximately 90 degrees, though in other embodiments, first angle 691 could have any other value.

Accordingly, to run parallel, second weld 687 may also be disposed about spacer textile material 600 at the same angle. Therefore, first channel 681, formed by first weld 680 and second weld 687, may have a uniform width.

In contrast, third weld 682 and fourth weld 683 may not run parallel to each other. In this case, third weld 682 may be form a second angle 693 with third edge 694 of spacer textile material 600. Fourth weld 683 may form a third angle 695 with third edge 694, where third angle 695 may be substantially different than second angle 693. In some embodiments, third angle 695 will be greater than second angle 693. In other embodiments, third angle 695 will be less than second angle 693. Because second angle 693 and third angle 695 may be substantially different angles, second channel 684 may have first width 685 at first edge 690 that is a smaller width than second width 686 at third edge 694.

Some portions of tensile strand 640 may extend through one or more channels, while other portions may extend outwardly from spacer textile material 600. As seen in FIG. 6, first portion 642 of tensile strand 640 may be disposed between first layer 610 and second layer 620 of spacer textile material 600. In addition, first portion 642 may be disposed in first channel 681 between first edge 690 and opposite third edge 694. Similarly, a third portion 644 of tensile strand 640 also may be disposed in second channel 684 between first edge 690 and third edge 694. A second portion 650 of tensile strand 640, disposed between first portion 642 and third portion 644, may extend outwardly from openings of first channel 681 and second channel 684 on third edge 694. In some cases, second portion 650 may form a loop that may engage with one or more external components or systems.

The configuration depicted in FIG. 6 allows the direction of the tension to be selectively tuned by varying the size and shape of the channels through which the portions of a tensile strand are disposed. Further, the tension may be selectively tuned by varying the position and angle of each channel disposed about the spacer textile material.

Figure 7:
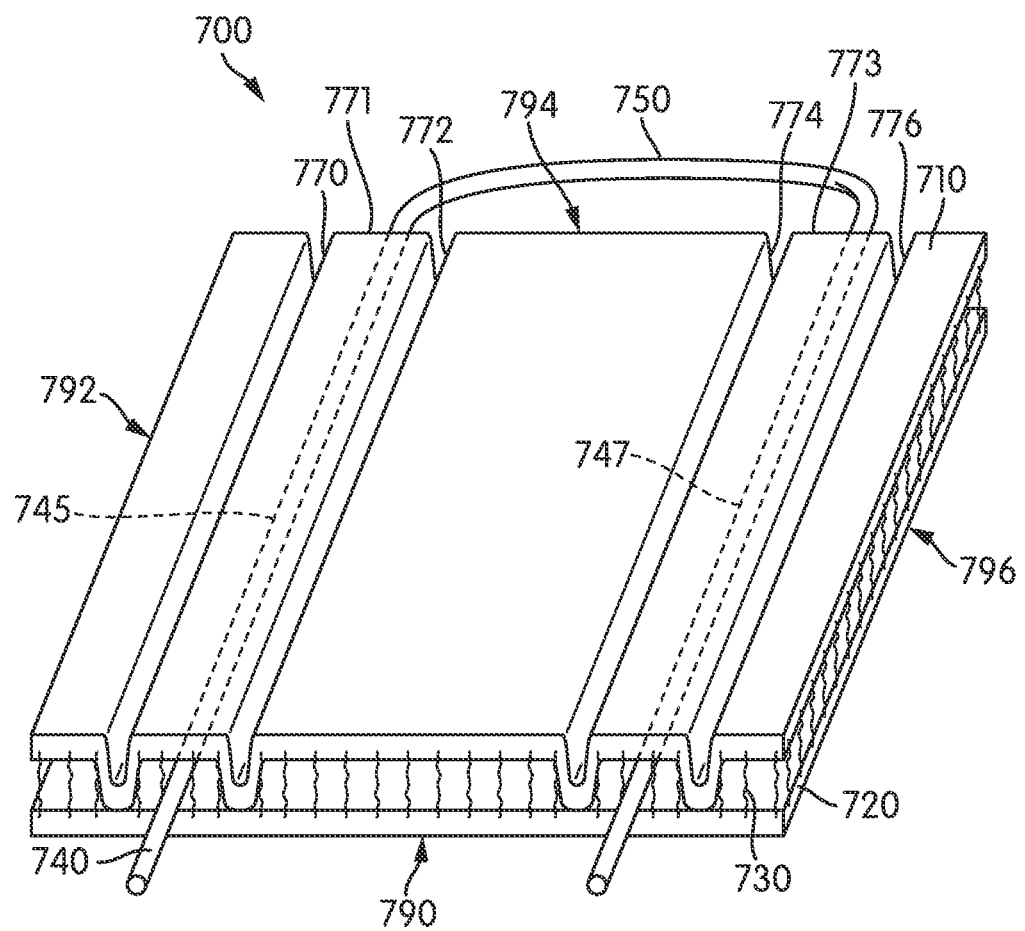
FIG. 7 is a schematic view of an embodiment of the spacer textile material having a tensile strand where the tensile strand is disposed between a first layer and a second layer and extends from the material along one or more edges of the material.

Similar to the embodiment depicted in FIG. 6, the embodiment of FIG. 7 may include provisions for controlling the orientation of a tensile strand, which may allow the direction of the tension to be better controlled through a portion of the spacer textile material. In contrast to the embodiment of FIG. 6, the embodiment shown in FIG. 7 may be characterized by channels that are substantially spaced apart from one another.

As shown in FIG. 7, a tensile strand 740 may be disposed between first layer 710 and second layer 720 of a spacer textile material 700. Further, spacer textile material 700 may include a plurality of connecting members 730 that extend between and join first layer 710 and second layer 720. Spacer textile material 700 also may have four edges, including first edge 790, second edge 792, third edge 794 and fourth edge 796, which are also edges of first layer 710 and second layer 720.

In some embodiments, portions of spacer textile material 700 may be welded together using methods such as those described above. Spacer textile material 700 may include first weld 770, second weld 772, third weld 774 and fourth weld 776. First weld 770, second weld 772, third weld 774 and fourth weld 776 form two channels, first channel 771 and second channel 773, in spacer textile material 700. Portions of tensile strand 740 may be disposed in each of the two channels.

In different embodiments, the spacing between channels may vary. For example, referring to FIG. 5, first channel 360 and second channel 362 are disposed adjacent to one another. In particular, the distance between first channel 360 and second channel 362 is less than the width of either first channel 360 or second channel 362. In contrast, in the embodiment shown in FIG. 7, first channel 771 and second channel 773 are spaced apart by a distance that is substantially greater than the width of first channel 771 or second channel 773. In still other embodiments, the spacing between two or more channels can vary in any other manner. The relative spacing between two or more channels can be selected to tune the tensioning of a material.

Some portions of tensile strand 740 may extend through one or more channels, while other portions may extend outwardly from spacer textile material 700. In the embodiment shown in FIG. 7, a first portion 745 of tensile strand 740 extends through first channel 771 from first edge 790 to third edge 794. Likewise, a third portion 747 extends through second channel 773 from third edge 794 to first edge 790. A second portion 750 is disposed between first portion 745 and third portion 747. In some cases, second portion 750 forms a loop that extends out of first channel 771, along third edge 794 and back through second channel 773.

The configuration depicted in FIG. 7 allows the direction and/or magnitude of the tension to be selectively tuned by varying the relative spacing between two or more channels in a spacer textile material.

Figure 8:
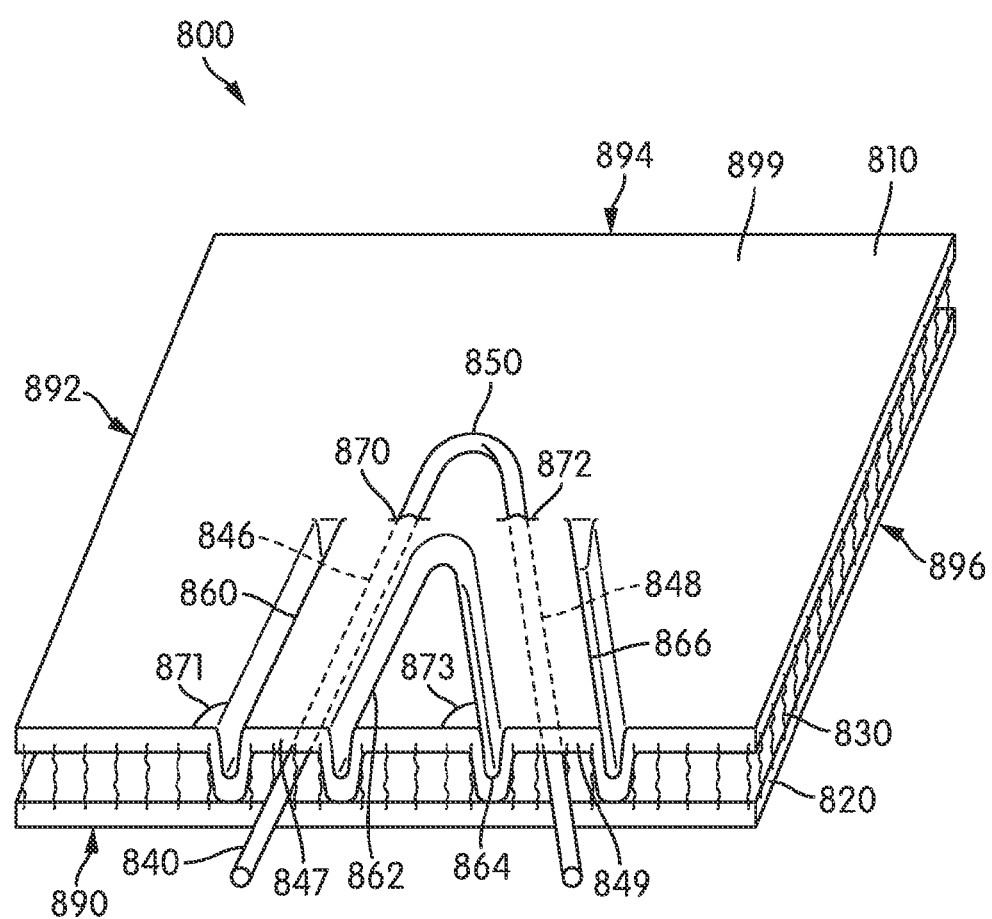
FIG. 8 is a schematic view of an embodiment of the spacer textile material having a tensile strand where the tensile strand is disposed on the interior and exterior of the spacer textile material.

FIG. 8 is an embodiment in which multiple portions of the tensile strand extend from and through the spacer textile material. A spacer textile material may include provisions for controlling the orientation of a tensile strand, which may allow the direction of the tension to be better controlled through a portion of a material, such as a footwear upper. In addition, portions of the tensile strand may be disposed above the face of a layer of the spacer textile material. In some embodiments, portions of the tensile strand that may be disposed above the face of a layer of a spacer textile material may interact with other features of an article of footwear, such the laces.

The embodiment depicted in FIG. 8 includes a tensile strand that extends from the spacer textile material along an edge as well as through the face of one layer. More specifically, portions of tensile strand 840 may be disposed between first layer 810 and second layer 820 of a spacer textile material 800. Further, spacer textile material 800 may include a plurality of connecting members 830 that extend between and join first layer 810 and second layer 820. Spacer textile material 800 of FIG. 8 also may have four edges, including first edge 890, second edge 892, third edge 894 and fourth edge 896, which are also edges of first layer 810 and second layer 820.

Spacer textile material 800 may include first weld 860, second weld 862, third weld 864, and fourth weld 866. First weld 860, second weld 862, third weld 864, and fourth weld 866 may form two channels, first channel 847 and second channel 849 in the spacer textile material 800. Portions of tensile strand 840 may be disposed in the two channels.

The channels of spacer textile material 800 may be disposed about spacer textile material 800 at different angles. For example, first channel 847 may be disposed about spacer textile material 800 at a first angle 871, relative to first edge 890. Second channel 849 may be disposed about spacer textile material 800 at a second angle 873, relative to first edge 890. In some embodiments, second angle 873 will be greater than first angle 871. In other embodiments, second angle 873 will be less than first angle 871. Further, in some embodiments, first channel 847 may be parallel to second channel 849. In other embodiments, first channel 847 may not be parallel to second channel 849. The position of each channel on the spacer textile material may depend on the support or tension desired on a footwear upper as well as possibly other factors.

Some portions of tensile strand 840 may extend through one or more channels, while other portions may extend outwardly from faces (i.e., an upper or lower surface) of spacer textile material 800. In FIG. 8, first portion 846 of tensile strand 840 may be disposed between first layer 810 and second layer 812 of spacer textile material 800. In addition, first portion 846 may be disposed in first channel 847, which extends to first opening 870. First opening 870 may be located on outer face 899 face of first layer 810. Tensile strand 840 may extend from spacer textile material 800 through first opening 870.

A second portion 850 of tensile strand 840 may extend from first opening 870 to second opening 872 and may be disposed outside of the spacer textile material 800. In some embodiments, second portion 850 forms a loop above outer face 899 of first layer 810. A third portion 848 of tensile strand 840 may be disposed in second channel 849 in spacer textile material 800 from second opening 872 to first edge 890.

The configuration depicted in FIG. 8 allows the direction of the tension to be selectively tuned by varying the angle of each channel relative to other channels or relative to an edge of the spacer textile material. Further, the tension may be selectively tuned by varying the arrangement or configuration of the tensile strand, including having portions disposed internally in a channel and/or externally above the face of one layer of the spacer textile material.

Figure 9:
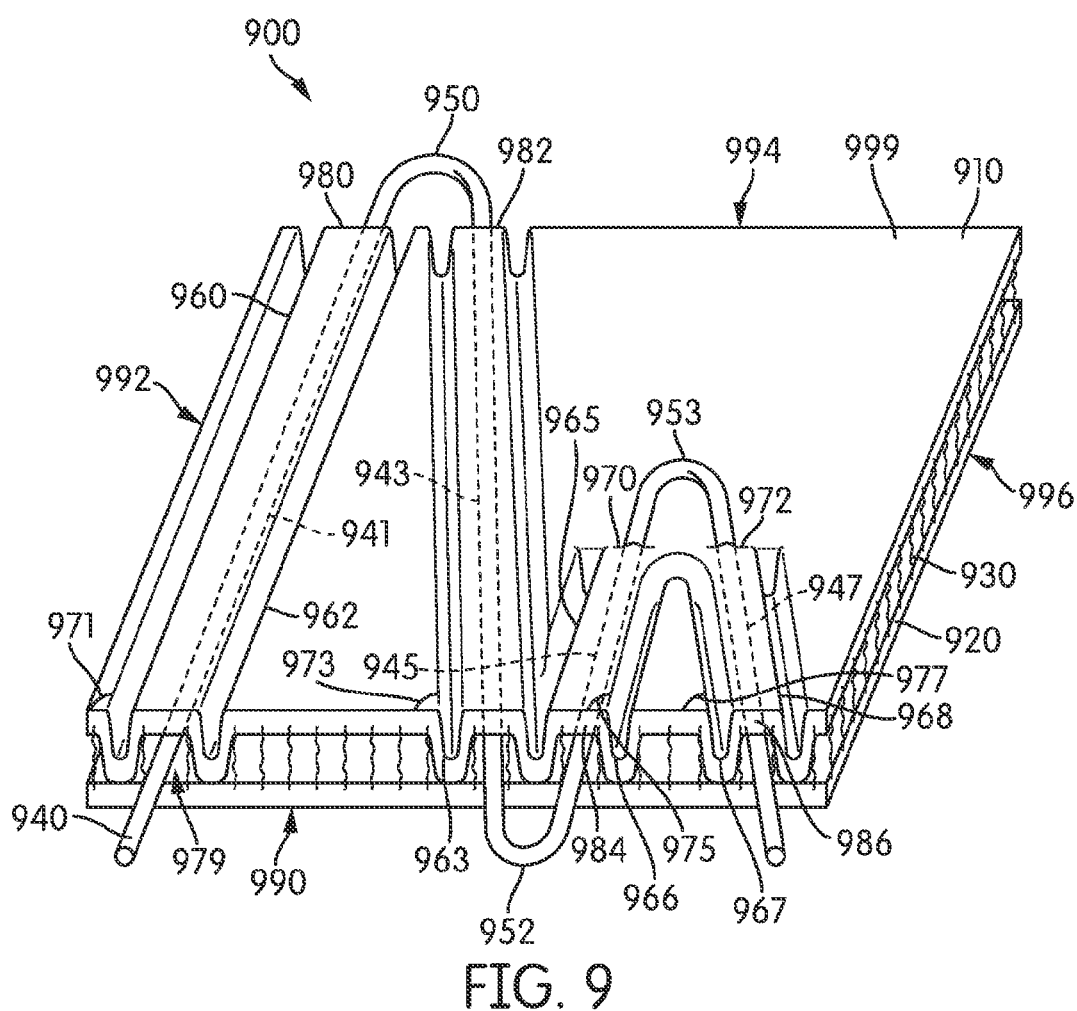
FIG. 9 is a schematic view of an embodiment of the spacer textile material having a tensile strand that is disposed on the interior and exterior of the spacer textile material in multiple locations.

FIG. 9 is another embodiment in which multiple portions of the tensile strand extend from and through the spacer textile material. A spacer textile material may include provisions for controlling the orientation of a tensile strand, which may allow the direction of the tension to be better controlled through multiple portions of the upper in multiple ways. In addition, the tensile strand may be disposed between the layers of the spacer textile material as well as above the face of a layer of the spacer textile material. The embodiment depicted in FIG. 9 shows that the tensile strand may be disposed about a spacer textile material in any number of positions and any combination of positions.

The embodiment shown in FIG. 9 includes portions of the tensile strand that may extend from locations along the edges of the material as well as through openings in the face of the first layer. Similar to the embodiments described above, a tensile strand 940 may be disposed between first layer 910 and second layer 920 of a spacer textile material 900. Further, spacer textile material 900 may include a plurality of connecting members 930 that extend between and join first layer 910 and second layer 920. Spacer textile material 900 also may have four edges, including first edge 990, second edge 992, third edge 994 and fourth edge 996, which are also edges of first layer 910 and second layer 920.

Spacer textile material 900 may include first weld 960, second weld 962, third weld 963, fourth weld 965, fifth weld 966, sixth weld 967, and seventh weld 968. First weld 960, second weld 962, third weld 963, fourth weld 965, fifth weld 966, sixth weld 967, and seventh weld 968 may form four channels, including first channel 980, second channel 982, third channel 984, and fourth channel 986, in the spacer textile material 900. Fourth weld 965 may include two portions. One portion of weld 965 may include a weld that extends from first edge 990 to third edge 994 and a second portion that extends from first edge 990 to first opening 970. Portions of tensile strand 940 may be disposed in each of the four channels.

The channels of spacer textile material 900 may be disposed about spacer textile material 900 at different angles. For example, first channel 980 may be disposed about spacer textile material 900 at a first angle 971, relative to first edge 990. Second channel 982 may be disposed about spacer textile material 900 at a second angle 973, relative to first edge 990. In some embodiments, second angle 973 will be greater than first angle 971. In other embodiments, second angle 973 will be less than first angle 971. Further, in some embodiments, first channel 980 may be parallel to second angle 982.

Similarly, third channel 984 may be disposed about spacer textile material at a third angle 975, relative to first edge 990. Further, fourth channel 986 may be disposed about spacer textile material 900 at a fourth angle 977, relative to first edge 990. In some embodiments, fourth angle 977 will be greater than third angle 975. In other embodiments, fourth angle 977 will be less than third angle 975. Further, in some embodiments, third channel 984 may be parallel to fourth angle 986. In some embodiments, any two or more of first angle 971, second angle 973, third angle 975 and fourth angle 977 may have substantially similar values. In other embodiments, no two angles may be similar. The angular position of each channel on the spacer textile material may depend on the support or tension desired on a footwear upper as well as possibly other factors.

In the configuration shown in FIG. 9, the arrangement of various channels and openings throughout spacer textile material 900 provides a zig-zag like arrangement for tensile strand 940. In particular, first portion 941 of tensile strand 940 may be disposed between first layer 910 and second layer 920 of spacer textile material 900. Further, first portion 941 may be disposed in a first channel 980 from a first opening along first edge 990 to reach opposite third edge 994. Tensile strand 940 may extend from spacer textile material 900 at a location along third edge 994. Third portion 943 of tensile strand 940 may extend from a first opening 979 along first edge 990 to reach opposite third edge 994.

Further, a second portion 950 of tensile strand 940 may be disposed outside of the spacer textile material forming a loop along third edge 994. In some cases, second portion 950 may extend from adjacent openings (not shown) along third edge 994. Third portion 943 of tensile strand 940 may be disposed in second channel 982 between first layer 910 and second layer 920 of spacer textile material 900 to reach first edge 990. Tensile strand 940 may extend from spacer textile material 900 at a location along first edge 990.

A fourth portion 952 may be disposed outside of spacer textile material 900 forming a loop along the first edge 990. A fifth portion 945 of tensile strand 940 may be disposed between first layer 910 and second layer 920 of spacer textile material 900 in a third channel 984 to extend to first opening 970. First opening 970 may be located on the face of first layer 910. Tensile strand 940 may extend from spacer textile material 900 through first opening 970.

Tensile strand 940 further may be disposed in spacer textile material 900 between first opening 970 and second opening 972 located on outer face 999 of first layer 910. Further, a sixth portion 953 of tensile strand 940 may be disposed outside of the spacer textile material forming a loop above the face of layer 910. A seventh portion 947 of tensile strand 940 may be disposed in a fourth channel 986 between first layer 910 and second layer 920 of spacer textile material 900 to reach first edge 990.

The configuration depicted in FIG. 9 allows the direction of the tension to be selectively tuned by varying the length and angle of the channels through which the portions of a tensile strand are disposed. Further, the tension may be selectively tuned by varying the position of each channel disposed about the spacer textile material. In this particular configuration, the zig-zag like arrangement for tensile strand 940 may allow a single tensile strand to provide tension control across an entire region of spacer textile material 900.

Figure 10:
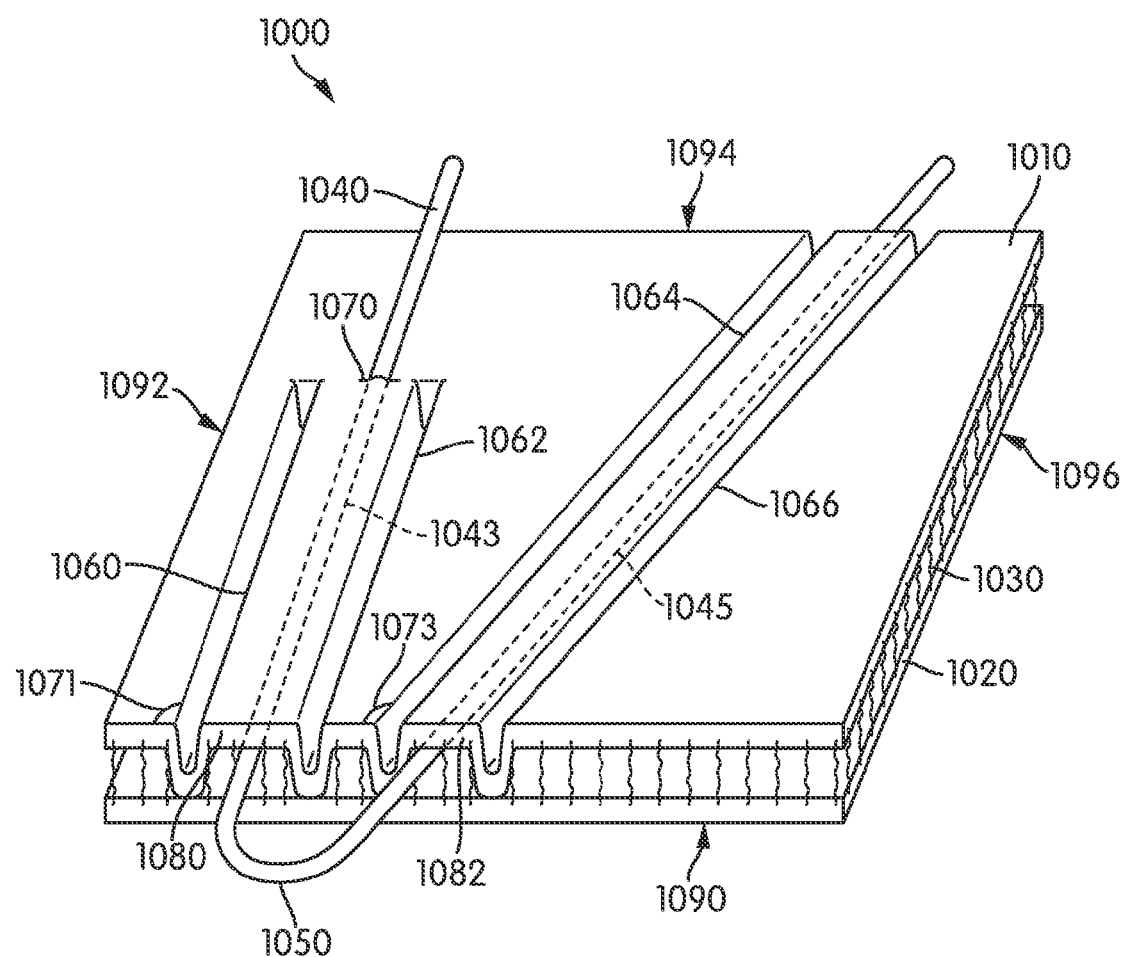
FIG. 10 is a schematic view of an embodiment of the spacer textile material having a tensile strand that is disposed on the interior and exterior of the spacer textile material in multiple locations.

FIG. 10 is yet another embodiment in which multiple portions of the tensile strand extend from and through the spacer textile material. A spacer textile material may include provisions for controlling the orientation of a tensile strand, which may allow the direction of the tension to be better controlled through a portion of the upper. Similar to FIG. 6, the portions of a tensile strand are disposed in two channels. Unlike FIG. 6, which illustrated the tensile strand extending through the edges of the spacer textile material, the embodiment of FIG. 10 illustrates that the tensile strand can extend from any opening on the spacer textile material.

The embodiment shown of FIG. 10 includes a tensile strand 1040 that may be disposed between first layer 1010 and second layer 1020 of a spacer textile material 1000. Further spacer textile material 1000 may include a plurality of connecting members 1030 that extend between and join layer 1010 and layer 1020. Spacer textile material 1000 also may have four edges, including first edge 1090, second edge 1092, third edge 1094 and fourth edge 1096, which are also edges of layer 1010 and layer 1020.

Spacer textile material 1000 includes first weld 1060, second weld 1062, third weld 1064 and fourth weld 1066. First weld 1060, second weld 1062, third weld 1064 and fourth weld 1066 form two channels, first channel 1080 and second channel 1082, in spacer textile material 1000. Portions of tensile strand 1040 may run through the two channels.

The channels of spacer textile material 1000 may be disposed about spacer textile material 1000 at different angles. For example, first channel 1080 may be disposed about spacer textile material 1000 at a first angle 1071, relative to first edge 1090. Second channel 1082 may be disposed about spacer textile material 1000 at a second angle 1073, relative to first edge 1090. In some embodiments, second angle 1073 will be greater than first angle 1071. In other embodiments, second angle 1073 will be less than first angle 1071. In still further embodiments, first angle 1071 and second angle 1073 may be substantially the same. In other words, in some embodiments, first channel 1080 may be parallel to second channel 1082. The position of each channel on the spacer textile material may depend on the support or tension desired on a footwear upper as well as possibly other factors.

Further, in FIG. 10, first portion 1043 of tensile strand 1040 may be disposed between first layer 1010 and second layer 1020 spacer textile material 1000. In addition, first portion 1043 may be disposed in a first channel 1080 from first opening 1070 in the face of first layer 1010 to extend to first edge 1090. Tensile strand 1040 may extend from spacer textile material 1000 at a first location along first edge 1090.

Further, a second portion 1050 of tensile strand 1040 may be disposed outside of the spacer textile material forming a loop along first edge 1090. Third portion 1045 of tensile strand 1040 may be disposed in a second channel 1082 between first layer 1010 and second layer 1020 of spacer textile material 1000 to extend to third edge 1094. Tensile strand 1040 may extend from spacer textile material 1000 along third edge 1094.

The configuration depicted in FIG. 10 allows the direction of the tension to be selectively tuned by varying the length and angle of the channels through which the portions of a tensile strand are disposed. Further, the tension may be selectively tuned by varying the position of the tensile strand in or about the spacer textile material.

The embodiments discussed above have all focused on one tensile strand having multiple portions that may be disposed within or about the spacer textile material at any location on the material. The following embodiments focus on embodiments having multiple tensile strands disposed throughout the spacer textile material.

Figure 11:
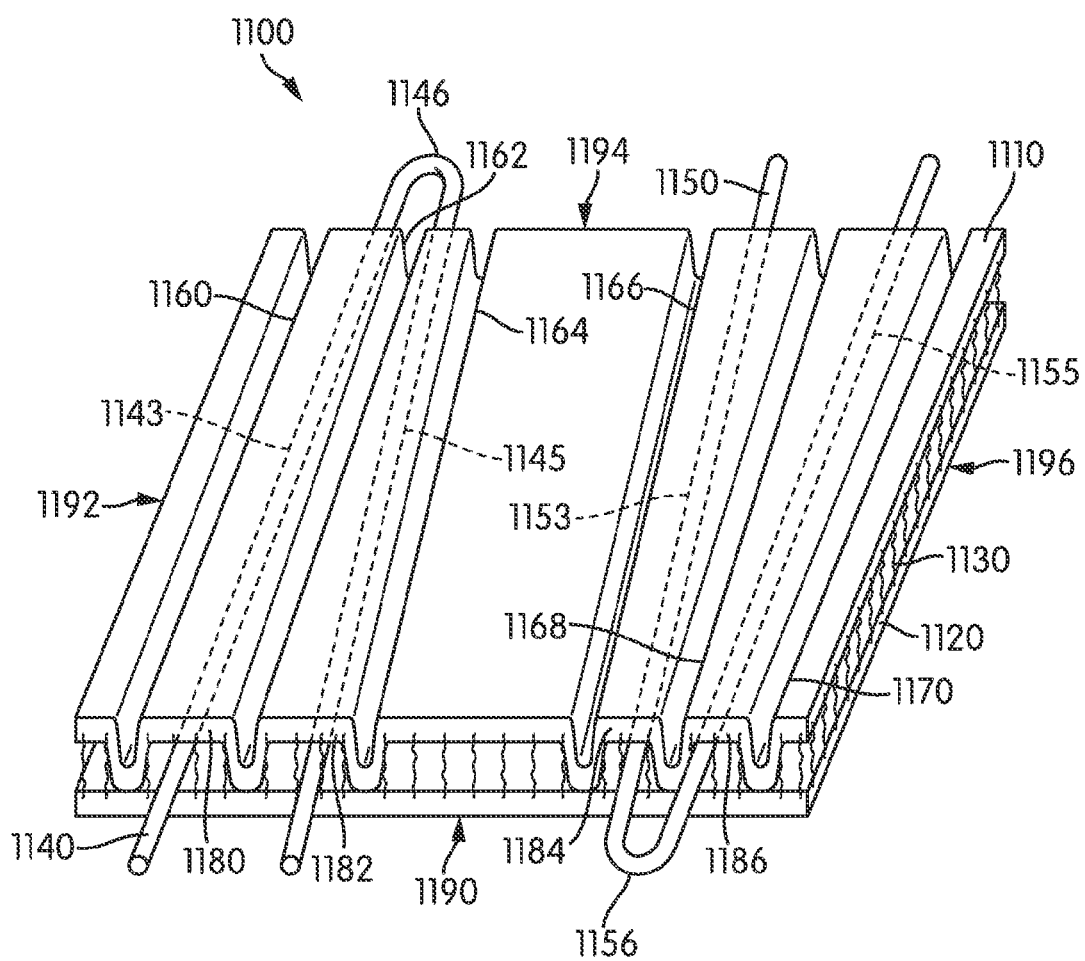
FIG. 11 is a schematic view of an embodiment of the spacer textile material having multiple tensile strands that are disposed on the interior and exterior of the spacer textile material in multiple locations.

FIG. 11 depicts an embodiment where at least two strands may be disposed within or about the spacer textile material. Each tensile strand may function independent of each other. Therefore, the tension of each tensile strand may be selectively tuned for the location of the tensile strand on or about the spacer textile material.

As shown in FIG. 11, portions of first tensile strand 1140 may be disposed between first layer 1110 and second layer 1120 of a spacer textile material 1100. In addition, portions of second tensile strand 1150 may be disposed between first layer 1110 and second layer 1120 of a spacer textile material 1100.

Further, spacer textile material 1100 may include a plurality of connecting members 1130 that extend between and join layer 1110 and layer 1120. Spacer textile material 1100 of FIG. 11 also may have four edges, including first edge 1190, second edge 1192, third edge 1194 and fourth edge 1196, which are also edges of layer 1110 and layer 1120.

Spacer textile material 1100 having first tensile strand 1140 and second tensile strand 1150 may further include first weld 1160, second weld 1162, third weld 1164, fourth weld 1166, fifth weld 1168, and sixth weld 1170. First weld 1160, second weld 1162, third weld 1164, fourth weld 1166, fifth weld 1168, and sixth weld 1170 form four channels, first channel 1180, second channel 1182, third channel 1184, and fourth channel 1186, in the spacer textile material 1100. Portions of first tensile strand 1140 and second tensile strand 1150 may run through any of the four channels. An exemplary configuration is described below.

The channels depicted in FIG. 11 may be of any shape, size length. In addition, each channel may be positioned about spacer textile material 1100 at any angle relative to an edge of spacer textile material 1100. In some embodiments, the channels disposed on spacer textile material 1100 may be parallel to each other. In other embodiments, the channels disposed on spacer textile material 1100 are not parallel to each other. Further, in still other embodiments, some channels may be parallel while others are not parallel. The position of each channel on the spacer textile material may depend on the support or tension desired on a footwear upper as well as possibly other factors.

First tensile strand 1140 may be disposed in spacer textile material 1100 at a location along first edge 1190. First tensile strand 1140 includes a first portion 1143 and a third portion 1145 that extend between first edge 1190 and third edge 1194. A second portion 1146 of tensile strand 1140 is disposed between first portion 1143 and third portion 1145. In some embodiments, second portion 1146 extends outwardly from third edge 1194 and forms a loop.

Second tensile strand 1150 includes a first portion 1153 extending through third channel 1184 and a third portion 1155 extending through fourth channel 1186. Second tensile strand 1150 may further include a second portion 1156 that extends from first portion 1143 to second portion 1155 along first edge 1190 and exterior to first layer 1110 and second layer 1120.

As show in FIG. 11, more than one tensile strand may be disposed between the first layer and second layer of a spacer textile material. By positioning each tensile strand in specific locations, the tension in each location may be selectively tuned with each tensile strand independent of the other tensile strands.

Figure 12:
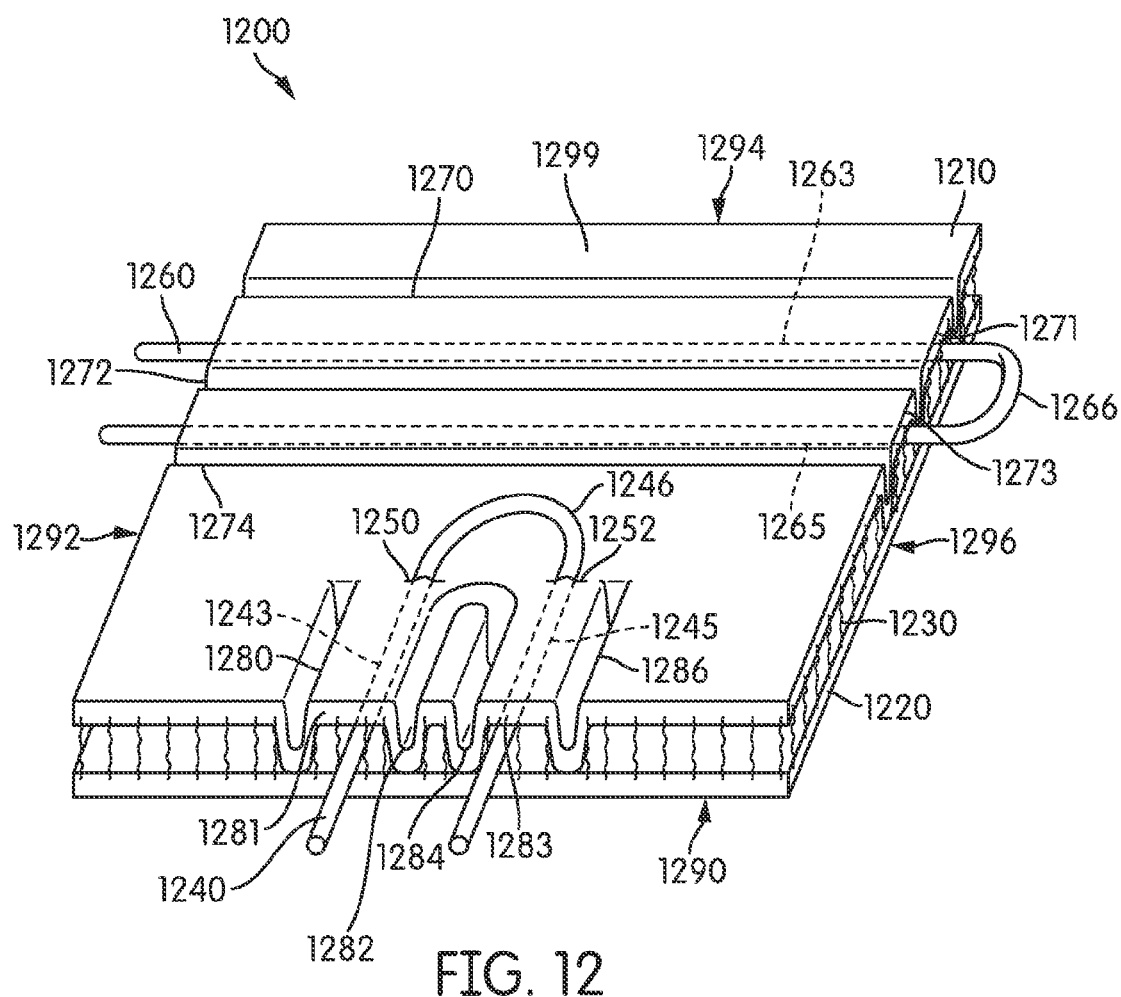
FIG. 12 is a schematic view of an embodiment of the spacer textile material having multiple tensile strands that are disposed on the interior and exterior of the spacer textile material in multiple locations.

FIG. 12 also depicts a spacer textile material having more than one tensile strand. However, unlike FIG. 11, in this embodiment, the tensile strands may extend from the spacer textile material in different manners and in different directions. Again, each tensile strand may function independent of each other. Therefore, the tension of each tensile strand may be selectively tuned for the specific location of the tensile strand on or about the spacer textile material.

As shown in FIG. 12, portions of a first tensile strand 1240 may be disposed between first layer 1210 and second layer 1220 of a spacer textile material 1200. In addition, portions of a second tensile strand 1260 may be disposed between first layer 1210 and second layer 1220 of a spacer textile material 1200.

Further, spacer textile material 1200 may include a plurality of connecting members 1230 that extend between and join layer 1210 and layer 1220. Spacer textile material 1200 of FIG. 12 also may have four edges, including first edge 1290, second edge 1292, third edge 1294 and fourth edge 1296, which are also edges of layer 1210 and layer 1220.

Spacer textile material 1200 may include first weld 1270, second weld 1272, third weld 1274, fourth weld 1280, fifth weld 1282, sixth weld 1284, and seventh weld 1286. First weld 1270, second weld 1272, third weld 1274, fourth weld 1280, fifth weld 1282, sixth weld 1284, and seventh weld 1286 form four channels, including first channel 1281, second channel 1283, third channel 1271, and fourth channel 1273, in the spacer textile material 1200. Portions of first tensile strand 1240 and second tensile strand 1260 may run through each of the four channels.

The channels depicted in FIG. 12 may be of any shape, size length. In addition, each channel may be positioned about spacer textile 1200 at any angle relative to an edge of spacer textile material 1200. In some embodiments, the channels disposed on spacer textile material 1200 may be parallel to each other. In other embodiments, the channels disposed on spacer textile material 1200 are not parallel to each other. Further, in still other embodiments, some channels may be parallel while others are not parallel. The position of each channel on the spacer textile material may depend on the support or tension desired on a footwear upper as well as possibly other factors.

First tensile strand 1240 may be disposed in spacer textile 1200 at a location along first edge 1290. First portion 1243 of first tensile strand 1240 may be disposed between first layer 1210 and second layer 1220 of spacer textile material 1200 in a first channel 1281. In addition, first portion 1243 may be disposed within first channel 1281 from first edge 1290 to first opening 1250. First opening 1250 may be located on outer face 1299 of first layer 1210. First tensile strand 1240 may extend from spacer textile material 1200 through first opening 1250.

First tensile strand may again be disposed in spacer textile material 1200 through second opening 1252 located on the face first layer 1210. Further, second portion 1246 of tensile strand 1240 may remain outside of the spacer textile material forming a loop above the face of layer 1210. Third portion 1245 of first tensile strand 1240 may be disposed in a second channel 1283 in spacer textile material 1200 from second opening 1252 to a location along first edge 1290.

In some embodiments, the configuration of second tensile strand 1260 may vary from the configuration of first tensile strand 1240. Second tensile strand 1260 may be disposed in the spacer textile material at a first location along second edge 1292. First portion 1263 of second tensile strand 1260 may be disposed between first layer 1210 and second layer 1220 of spacer textile material 1200. In addition, first portion 1263 may be disposed in third channel 1271. First portion 1263 may further be disposed within third channel 1271 from second edge 1292 to opposite fourth edge 1296.

Second tensile strand 1260 may extend from spacer textile material 1200 at a first location along fourth edge 1296. Further, a second portion 1266 of second tensile strand 1260 may remain outside of the spacer textile material forming a loop along fourth edge 1296. Third portion 1265 of second tensile strand 1260 may be disposed in a fourth channel 1273 between first layer 1210 and second layer 1220 in spacer textile material 1200. Third portion 1265 may be disposed within fourth channel 1273 from fourth edge 1296 to a second location along second edge 1292.

As show in FIG. 12, more than one tensile strand may be disposed between the first layer and second layer of a spacer textile material in more than one manner. By positioning each tensile strand in specific locations, the tension in each location may be selectively tuned with each tensile strand independent of the tensile strands.

Figure 13:
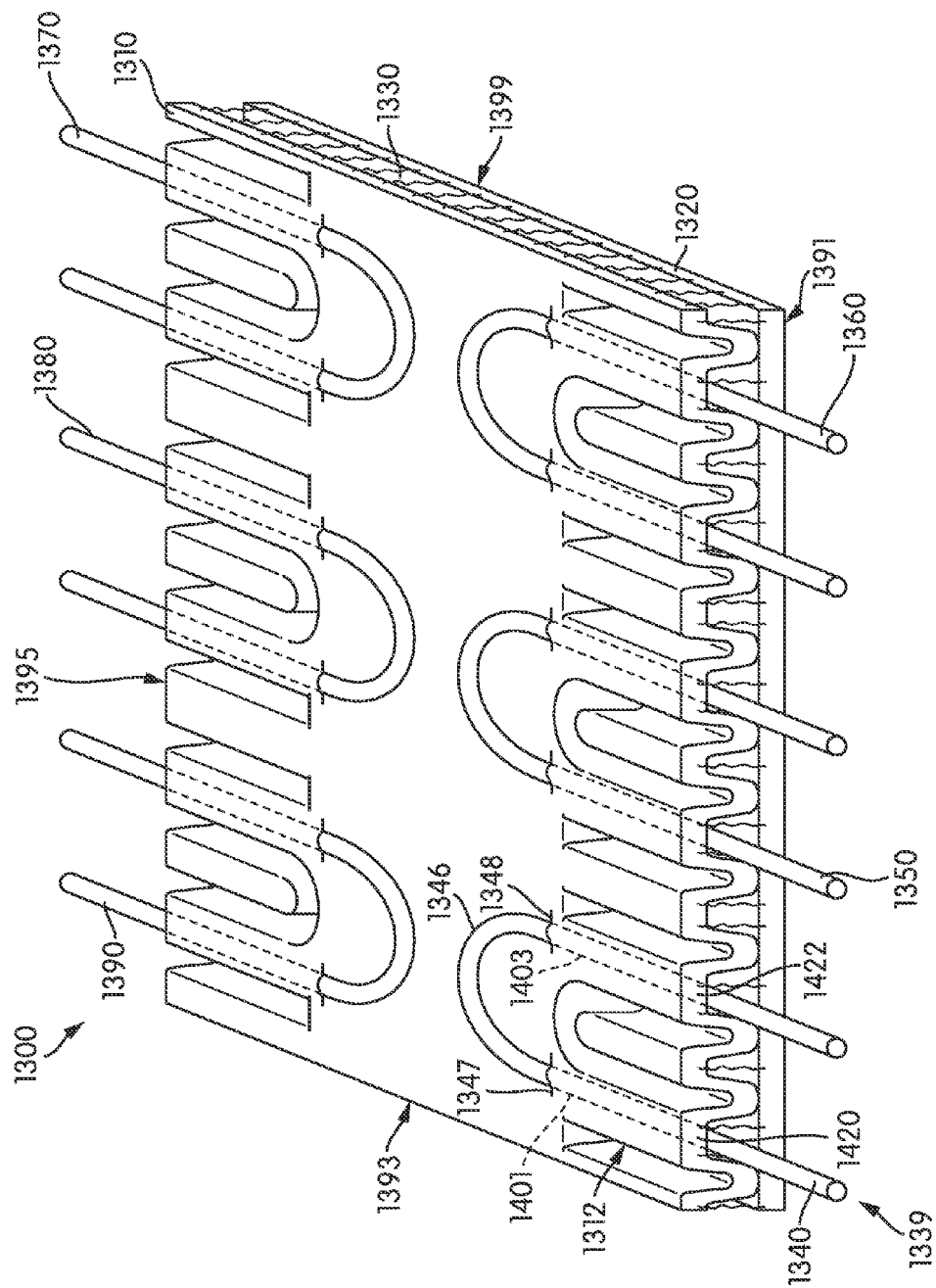
FIG. 13 is a schematic view of an embodiment of the spacer textile material having multiple tensile strands that are disposed on the interior and exterior of the spacer textile material in multiple locations.

Other embodiments of the disclosure may include more than two tensile strands. The spacer textile material may include six or more tensile strands with at least a portion of each tensile strand disposed between a first layer and a second layer. Each tensile strand may function independent of each other. Therefore, the tension of each tensile strand may be selectively tuned for the specific location of the tensile strand on or about the spacer textile material. FIG. 13 depicts one such embodiment.

A plurality of tensile strands 1339 are shown disposed between first layer 1310 and second layer 1320. Portions of a first tensile strand 1340 may be disposed between first layer 1310 and second layer 1320 of a spacer textile material 1300. In addition, portions of second tensile strand 1350, third tensile strand 1360, fourth tensile strand 1370, fifth tensile strand 1380, and sixth tensile strand 1390 may be disposed between first layer 1310 and second layer 1320 of a spacer textile material 1300.

Further, spacer textile material 1300 may include a plurality of connecting members 1330 that extend between and join layer 1310 and layer 1320. Spacer textile material 1300 also may have four edges, including first edge 1391, second edge 1393, third edge 1395 and fourth edge 1399, which are also edges of layer 1310 and layer 1320.

Spacer textile material 1300 may include a plurality of welds 1312 that are configured to house portions of plurality of tensile strands 1339. Moreover, the configurations and arrangements of each weld are selected to achieve a desired arrangement of tensile strands within spacer textile material 1300. As one particular example, first tensile strand 1340 may be disposed in spacer textile 1300 at first location along first edge 1391. First portion 1401 of first tensile strand 1340 may be disposed between first layer 1310 and second layer 1320 of spacer textile material 1300. Further, first portion 1401 may be disposed in a first channel 1420 from first edge 1391 to first opening 1347. First opening 1347 may be located on the face of first layer 1310. First tensile strand 1340 may extend from spacer textile material 1300 through first opening 1347.

First tensile strand 1340 may again be disposed in spacer textile material 1300 through second opening 1348 located on the face first layer 1310. Further, a second portion 1346 of first tensile strand 1340 may remain outside of the spacer textile material forming a loop above the face of layer 1310. Third portion 1403 of first tensile strand 1340 may be disposed in a second channel 1422 in spacer textile material 1300 to extend from second opening 1348 to a second location along first edge 1391.

In a similar manner, each of the tensile strands of plurality of tensile strands 1339 may be configured through corresponding channels and openings of spacer textile material 1300. In particular, the arrangement shown in FIG. 13 may allow for a plurality of loops formed by portions of plurality of tensile strands 1339 to be disposed adjacent to one another. In some cases, these loops could receive one or more laces, cables, straps or other kinds of fasteners or tensioning devices that may act to apply tension to each tensile member in a substantially uniform manner.

As depicted in FIG. 13, more than one tensile strand may be disposed between the first layer and second layer of a spacer textile material in more than one manner. By positioning each tensile strand in specific locations, the tension in each location may be selectively tuned with each tensile strand independent of the other tensile strands.

The above described spacer textile material may be incorporated into at least a portion of an article of footwear. The spacer textile material may be incorporated into at least a portion of a shoe upper. In some embodiments, the spacer textile material is the shoe upper.

When incorporated into a shoe upper, the spacer textile material may have any number of tensile strands. The tensile strands of the spacer textile material incorporated into a shoe upper may be disposed in the spacer textile material in any location within or about the spacer textile material. An embodiment, as shown in FIG. 14, incorporates multiple tensile strands into a spacer textile material.

The tensile strands shown in article of footwear 1500 depicted in FIG. 14 may be disposed in spacer textile material 1510 incorporated into shoe upper 1512. As shown in FIG. 14, spacer textile material 1510 may include multiple welds that define multiple channels. For example, first weld 1522 and second weld 1524 define first channel 1530. Similarly, third weld 1526 and fourth weld 1528 define second channel 1532. Likewise, additional channels may be formed on upper 1512, as seen in FIG. 14, using various welds.

First portion 1542 of tensile strand 1540 may be disposed in first channel 1530. Further, first portion 1542 may extend from sole structure 1520 within first channel 1530 to first opening 1560 disposed on the outer surface of spacer textile material 1510. Tensile strand 1540 may extend from spacer textile material 1510 through first opening 1560. Second portion 1543 of tensile strand 1540 may form a loop on the exterior of spacer textile material 1510. Second portion 1543 may be disposed between first opening 1560 and second opening 1562.

Third portion 1544 of tensile strand 1540 may be further disposed in the spacer textile material through second opening 1562. Third portion 1544 may extend from second opening 1562 within second channel 1532 to sole structure 1520. Portions of additional tensile strands shown in FIG. 14 may further be similarly disposed in the spacer textile material and through the remaining channels.

As shown in FIG. 14, a portion of each tensile strand may remain outside of the spacer textile material between the two openings on the outer face or surface of the spacer textile material. This exposed portion of the tensile strand may be a loop that may be utilized as a shoe lace eyelet. In some embodiments, a shoe lace may be disposed through the multiple loops in the shoe upper of FIG. 14.

More specifically, second portion 1543 of tensile strand 1540 forms a loop on the exterior of spacer textile material 1510. The loop, or second portion 1543, may be disposed between first opening 1560 and second opening 1562. The loop, or second portion 1543, may also act as an eyelet to receive the shoe lace 1550.

When shoe lace 1550 is tightened, tensile strand 1540 is also tightened, or in other words, placed under an increased tension. The tightened tensile strand 1540 provides both better support and a better fit for the wearer of the shoe in the particular area that tensile strand 1540 is disposed about spacer textile material 1510. Therefore, the wearer of the shoe may tighten shoe lace 1550 to customize the fit of upper 1512 of shoe 1500. In a similar manner, each of the remaining tensile strands associated with article 1500 may be configured to engage lace 1550.

In addition, in some embodiments, each tensile strand may have the same stretch and flexibility. In other embodiments, each tensile strand may have different flexibility or stretch. Accordingly, a tensile strand may be selectively disposed in or about the spacer textile material in specific locations to provide specific support. For instance, a tensile strand having less flexibility or stretch may be located in or about the spacer textile material of the shoe upper in an area that requires more support. Further, a tensile strand having greater flexibility or stretch may be located in or about the spacer textile material of the shoe upper in an area that requires more flex and stretch during use. Therefore, a shoe upper may include multiple tensile strands with varying degrees of stretch and flex. The stretch and flex of each tensile strand will depend on its location on a particular shoe upper.

While FIG. 14 depicts an article of footwear comprising a shoe upper having a spacer textile material that includes multiple tensile strands, the disclosure is not limited to the particular pattern depicted in FIG. 14. Any of the various patterns, or any combination of patterns, described above may be incorporated into a similar article of footwear as well as possibly other articles and other kinds of apparel.

During activities that involve walking, running, or other ambulatory movements (e.g., cutting, braking), a foot within the shoes described above may tend to stretch the upper component of the shoe. That is, many of the material elements forming the upper (e.g., spacer textile material layers) may stretch when placed in tension by movements of the foot. Although the tensile strands or individual segments of the tensile strands may also stretch, the tensile strand generally stretches to a lesser degree than the other material elements forming the upper. The various segments of the tensile strands may be located, therefore, to form structural components in the upper that (a) resist stretching in specific directions or locations, (b) limit excess movement of the foot relative to the sole structure and the upper, (c) ensure that the foot remains properly positioned relative to the sole structure and the upper, and (d) reinforce locations where forces are concentrated.

In addition, the welds forming the channels of the spacer textile material may also form structural components in the upper. The welds, a fusion of the first layer to the second layer of the spacer textile material, may also assist the upper to (a) resist stretching in specific directions or locations, (b) limit excess movement of the foot relative to the sole structure and the upper, (c) ensure that the foot remains properly positioned relative to the sole structure and the upper, and (d) reinforce locations where forces are concentrated.

In addition above advantages, the tensile strands also may extend at least partially around lace apertures or act as lace apertures themselves. As such, a tensile strand may (a) extend upward from lower region of the upper or from the sole structure to a lace region, (b) extend from the spacer textile materials forming a loop in the lace region, and (c) travel downward from the lace region to the lower region of the upper or the sole structure. In this manner, the loops formed from the tensile strands effectively are lace apertures. A shoe lace may be laced through the tensile strand loops. When the lace is tightened, tension in the lace effectively places the tensile strands in tension, which has the advantage of tightening the upper around the foot and further (a) limiting excess movement of the foot relative to the sole structure and the upper, and (b) ensuring that the foot remains properly positioned relative to the sole structure and the upper.

Based upon the above discussion, the spacer textile material having tensile strands may have various configurations. Although each of these configurations are discussed separately, many of the concepts presented above may be combined to impart specific properties or otherwise ensure that spacer textile material having tensile strands are optimized for a particular purpose or product.

In still other embodiments, a spacer textile material including tensile strands arranged in various configurations may incorporated into various kinds of articles including, but are not limited to: hiking boots, soccer shoes, football shoes, sneakers, running shoes, cross-training shoes, rugby shoes, basketball shoes, baseball shoes as well as other kinds of shoes. Moreover, in some embodiments, a spacer textile material may be incorporated into various kinds of nonsports related footwear, including, but not limited to: slippers, sandals, high heeled footwear, loafers as well as any other kinds of footwear.

The spacer textile material could also be incorporated into various kinds of articles of apparel and/or sporting equipment (e.g., gloves, helmets, etc.). In some embodiments, the article may include one or more articulated portions that are configured to move. In other cases, the article may be configured to conform to portions of a wearer in a three-dimensional manner. Examples of articles that are configured to be worn include, but are not limited to: footwear, gloves, shirts, pants, socks, scarves, hats, jackets, as well as other articles. Other examples of articles include, but are not limited to: protective equipment such as shin guards, knee pads, elbow pads, shoulder pads, as well as any other type of protective equipment. Additionally, in some embodiments, the article could be another type of article including, but not limited to: bags, purses, backpacks, as well as other articles that may or may not be worn.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

What is claimed is:

1. An article of footwear comprising:
   an upper, wherein at least a portion of the upper comprises a spacer textile material;
   the spacer textile material further including a first layer, a second layer and a plurality of connecting members extending between and joining the first layer and the second layer;
   spacer textile material further including a tensile strand; and wherein the spacer textile material includes a first channel configured to receive a first portion of the tensile strand and a second channel configured to receive a second portion of the tensile strand;
   wherein a third portion of the tensile strand extends outwardly from a first opening on an outer face of the first layer;
   wherein the first channel is disposed at a first angle relative to a first edge of the spacer textile material;
   wherein the second channel is disposed at a second angle relative to the first edge of the spacer textile material; and
   wherein the second angle is substantially different than the first angle.

2. The article of footwear according to claim 1, wherein the second angle is greater than the first angle.

3. The article of footwear according to claim 1, wherein the first channel is formed using welds that join the first layer directly to the second layer and the second channel is formed using welds that join the first layer directly to the second layer.

4. The article of footwear according to claim 1, wherein a fourth portion of the tensile strand is disposed outside of the first channel and wherein the fourth portion of the tensile strand forms a loop between the first channel and the second channel.

5. The article of footwear according to claim 4, further comprising a third channel disposed at a third angle relative to the first edge of the spacer textile material;
   wherein the third portion of the tensile strand extends from the first opening on the outer face of the first layer to a second opening on the outer face of the first layer a distance from the first opening to form a loop.

6. The article of footwear according to claim 1, wherein the second channel extends from the first edge of the spacer textile material to a second edge of the spacer textile material.

7. The article of footwear according to claim 5, wherein a lace of the upper is inserted through the loop such that tensioning the lace tensions the tensile strand.

8. A spacer textile material comprising:
   a first layer;
   a second layer;
   a plurality of connecting members extending between and joining the first layer and the second layer;
   a tensile strand, wherein a first portion of the tensile strand is disposed between the first layer and second layer,
   a first channel bounded by portions of the first layer and the second layer that are in direct contact, the first channel is disposed at a first angle relative to a first edge of the spacer textile material;
   wherein the first portion of the tensile strand that is disposed between the first layer and second layer is located within the first channel;
   wherein a second portion of the tensile strand extends outside of the spacer textile material from the first edge of the spacer textile material;
   wherein a third portion of the tensile strand extends outwardly from a first opening on an outer face of the first layer of the spacer textile material;
   a second channel bounded by portions of the first layer and the second layer that are in direct contact, the second channel is disposed at a second angle relative to the first edge of the spacer textile material;
   wherein the second angle is substantially different than the first angle; and
   wherein a fourth portion of the tensile strand is located within the second channel.

9. The spacer textile material according to claim 8, wherein the second channel extends between the first edge of the spacer textile material and a second edge of the spacer textile material.

10. The spacer textile material according to claim 8, wherein the second portion of the tensile strand forms a loop that extends outwardly from the first edge of the spacer textile material.

11. The spacer textile material according to claim 8, wherein the portions of the first layer and the second layer that are in direct contact comprise portions where the first layer is welded to the second layer.

12. A spacer textile material comprising:
    a first layer;
    a second layer;
    a plurality of connecting members extending between and joining the first layer and the second layer;
    a first tensile strand;
    a second tensile strand;
    a first channel bounded by portions of the first layer and the second layer that are in direct contact, the first channel extending from a first edge of the spacer textile material;
    a second channel bounded by portions of the first layer and the second layer that are in direct contact, the second channel extending from a second edge of the spacer textile material;

wherein a first portion of the first tensile strand is disposed between the first layer and the second layer in the first channel;

wherein a second portion of the first tensile strand extends outwardly from a first opening on an outer surface of the first layer; and wherein a first portion of the second tensile strand is disposed between the first layer and the second layer in the second channel.

13. The spacer textile material according to claim 12, further comprising a third channel bounded by portions of the first layer and the second layer that are in direct contact, the third channel extending from the first edge of the spacer textile material;

wherein a third portion of the first tensile strand extends outside of the spacer textile material from the first edge of the spacer textile material; and wherein the second portion of the first tensile strand extends from the first opening on the outer surface of the first layer to a second opening on the outer surface of the first layer to form a loop between the first channel and the third channel.

14. The spacer textile material according to claim 13, wherein the second channel extends from the second edge of the spacer textile material to a third edge of the spacer textile material.

15. The spacer textile material according to claim 14, wherein a second portion of the second tensile strand extends outside of the spacer textile material from the second edge of the spacer textile material; and wherein a third portion of the second tensile strand extends outside of the spacer textile material from the third edge of the spacer textile material.

16. The spacer textile material according to claim 15, further comprising a fourth channel bounded by portions of the first layer and the second layer that are in direct contact, the fourth channel extending from the second edge of the spacer textile material; and wherein the third portion of the second tensile strand forms a loop between the second channel and the fourth channel.

17. The spacer textile material according to claim 13, wherein a second portion of the second tensile strand extends outside of the spacer textile material from the second edge of the spacer textile material;

wherein the second edge is located opposite the first edge;

wherein a third portion of the second tensile strand extends outwardly from a third opening on the outer surface of the first layer of the spacer textile material.

18. The spacer textile material according to claim 17, wherein the third portion of the second tensile strand extends outwardly from the third opening on the outer surface of the first layer of the spacer textile material to a fourth opening on the outer surface of the first layer a distance from the third opening to form a loop.

19. An article of footwear comprising:

an upper, wherein at least a portion of the upper comprises a spacer textile material;

the spacer textile material further including a first layer, a second layer and a plurality of connecting members extending between and joining the first layer and the second layer;

the spacer textile material further including a plurality of tensile strands;

the spacer textile material further including a plurality of channels;

wherein each of the plurality of channels are bounded by portions of the first layer and the second layer that are in direct contact, at least a first channel of the plurality of channels extending from a first edge of the spacer textile material;

at least a second channel of the plurality of channels extending from a second edge of the spacer textile material;

wherein a first portion of a first tensile strand of the plurality of tensile strands is disposed between the first layer and the second layer in the at least first channel;

wherein a second portion of the first tensile strand extends outwardly from a first opening on an outer surface of the first layer; and wherein a first portion of the second tensile strand of the plurality of tensile strands is disposed between the first layer and the second layer in the at least second channel.

20. The article of footwear according to claim 19, wherein the plurality of channels are each formed using welds that join the first layer directly to the second layer.

21. The article of footwear according to claim 20, further comprising at least a third channel of the plurality of channels extending from the first edge of the spacer textile material; and wherein the second portion of the first tensile strand extends from the first opening on the outer surface of the first layer to a second opening on the outer surface of the first layer to form a loop between the at least first channel and the at least third channel.

22. The article of footwear according to claim 21, wherein the at least second channel extends from the second edge of the spacer textile material to a third edge of the spacer textile material.

23. The article of footwear according to claim 22, wherein a second portion of the second tensile strand extends outside of the spacer textile material from the second edge of the spacer textile material between two adjacent openings on the second edge of the spacer textile material; and wherein a third portion of the second tensile strand extends outside of the spacer textile material from the third edge of the spacer textile material.

24. The article of footwear according to claim 23, wherein the two adjacent openings are associated with two adjacent channels of the plurality of channels.

25. The article of footwear according to claim 21, further comprising at least a fourth channel of the plurality of channels extending from the second edge of the spacer textile material; and wherein a second portion of the second tensile strand extends outwardly from a third opening on the outer surface of the first layer of the spacer textile material to a fourth opening on the outer surface of the first layer to form a loop between the at least second channel and the at least fourth channel.

26. The article of footwear according to claim 25, wherein a third portion of the second tensile strand extends outside of the spacer textile material from the second edge of the spacer textile material; and wherein the second edge is located opposite the first edge.

27. The article of footwear according to claim 24, further comprising at least a fourth channel of the plurality of channels extending from the second edge of the spacer textile material to the third edge of the spacer textile material; and wherein the third portion of the second tensile strand forms a loop between the at least second channel and the at least fourth channel.

28. The article of footwear according to claim 21, wherein a lace of the upper is inserted through the loop of the first tensile strand such that tensioning the lace tensions the first tensile strand.

* * * * *